US012799342B2

(12) United States Patent
Shiraki et al.

(10) Patent No.: US 12,799,342 B2
(45) Date of Patent: Nov. 17, 2026

(54) ACTIVE ENERGY RAY CURABLE-TYPE INK, INK SET, AND MANUFACTURING METHOD OF LAMINATE

(71) Applicant: FUJIFILM CORPORATION, Tokyo (JP)

(72) Inventors: Fumiya Shiraki, Kanagawa (JP); Tsutomu Umebayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 124 days.

(21) Appl. No.: 18/776,076

(22) Filed: Jul. 17, 2024

(65) Prior Publication Data

US 2025/0043139 A1 Feb. 6, 2025

(30) Foreign Application Priority Data

Jul. 28, 2023 (JP) ................................ 2023-123157

(51) Int. Cl.

| | |
|---|---|
| ***C09D 11/322*** | (2014.01) |
| ***B41J 2/01*** | (2006.01) |
| ***B41J 2/21*** | (2006.01) |
| ***B41J 11/00*** | (2006.01) |
| ***C09D 11/101*** | (2014.01) |
| ***C09D 11/106*** | (2014.01) |
| ***C09D 11/326*** | (2014.01) |
| ***C09D 11/38*** | (2014.01) |
| ***C09D 11/40*** | (2014.01) |

(52) U.S. Cl.

CPC ............... *C09D 11/322* (2013.01); *B41J 2/01* (2013.01); *B41J 2/2107* (2013.01); *B41J 11/00214* (2021.01); *C09D 11/101* (2013.01); *C09D 11/106* (2013.01); *C09D 11/326* (2013.01); *C09D 11/38* (2013.01); *C09D 11/40* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 10,435,577 B2 | 10/2019 | Kamada et al. | | |
| 11,458,754 B2 | 10/2022 | Umebayashi | | |
| 2007/0042162 A1* | 2/2007 | Selman | C09D 11/101 | 347/224 |
| 2009/0118388 A1* | 5/2009 | Naruse | C09D 11/101 | 522/39 |
| 2015/0002575 A1* | 1/2015 | Blanton | C09D 11/38 | 106/18.32 |
| 2019/0185693 A1 | 6/2019 | Umebayashi et al. | | |
| 2019/0352526 A1* | 11/2019 | Fujii | B41J 2/01 | |
| 2021/0079243 A1* | 3/2021 | Fujii | C09D 11/102 | |

FOREIGN PATENT DOCUMENTS

| | | |
|---|---|---|
| EP | 3053971 B1 | 12/2019 |
| JP | 4023323 B2 | 12/2007 |
| JP | 2021-161182 A | 10/2021 |

OTHER PUBLICATIONS

Extended European Search Report dated Dec. 13, 2024, issued in corresponding EP Patent Application No. 24189780.0.

* cited by examiner

*Primary Examiner* — Manish S Shah

(74) *Attorney, Agent, or Firm* — SOLARIS Intellectual Property Group, PLLC

(57) ABSTRACT

Provided are an active energy ray curable-type ink containing a resin-coated pigment in which a pigment is coated with a vinyl chloride-vinyl acetate copolymer resin and a polymerizable compound, in which the pigment is a magenta pigment which is PR146 and/or PR254 or a yellow pigment which is at least one of PY110, PY155, PY185, PY138, PY150, or Pigment Yellow184, a content mass ratio of the vinyl chloride-vinyl acetate copolymer resin with respect to the pigment is 0.25 to 4.00, and an Mp/D ratio, which is a ratio between a content Mp % by mass of the pigment with respect to a total amount of the ink and a specific gravity D of the pigment, is 2.00 or less; and applications thereof.

7 Claims, No Drawings

ACTIVE ENERGY RAY CURABLE-TYPE INK, INK SET, AND MANUFACTURING METHOD OF LAMINATE

CROSS-REFERENCE TO RELATED APPLICATIONS

This application claims priority, under 35 U.S.C. § 119, from Japanese Patent Application No. 2023-123157, filed Jul. 28, 2023, the entire disclosure of which is incorporated herein by reference.

BACKGROUND OF THE INVENTION

1. Field of the Invention

The present disclosure relates to an active energy ray curable-type ink, an ink set, and a manufacturing method of a laminate.

2. Description of the Related Art

In the related art, various studies have been conducted on image recording using an active energy ray curable-type ink.

For example, JP2021-161182A discloses an ink composition which is an active energy ray curable-type ink composition containing (A) a polymerizable compound, (B) a photopolymerization initiator, and (C) an ultraviolet absorber and/or (D) a radical scavenger, in which the (A) polymerizable compound includes a monofunctional polymerizable compound and a polyfunctional polymerizable compound, and the monofunctional polymerizable compound includes at least one monofunctional polymerizable compound (a) selected from the group consisting of a monofunctional polymerizable compound (a-1) which has a molecular weight of 250 g/mol or less and a melting point of 25° C. or higher, a monofunctional polymerizable compound (a-2) which has a molecular weight of 250 g/mol or less, a melting point of lower than 25° C., and a viscosity of 20 mPa·s or more at 25° C., and a monofunctional polymerizable compound (a-3) other than the monofunctional polymerizable compound (a-1) and the monofunctional polymerizable compound (a-2), which has an amide group and a cyclic structure.

SUMMARY OF THE INVENTION

In a case where an image is recorded on a base material for image recording, containing a polymer (for example, polyvinyl chloride) including vinyl chloride as a constitutional unit, to obtain an image recorded material, a laminate may be manufactured by laminating a base material for lamination, containing the polymer including vinyl chloride as a constitutional unit, on the image in the image recorded material. In this case, it is required to improve adhesiveness between the image and the base material for lamination.

In addition, the image may be required to have light fastness, and the active energy ray curable-type ink may be required to have ink jet suitability (that is, jettability from an ink jet head in a case of being used as an ink jet ink).

The present disclosure has been made in view of such circumstances, and an object to be achieved by an embodiment of the present disclosure is to provide an active energy ray curable-type ink which is capable of recording an image having excellent light fastness and having excellent lamination adhesiveness with a base material for lamination, containing a polymer including vinyl chloride as a constitutional unit, and which has excellent ink jet suitability.

Another object to be achieved by another embodiment of the present disclosure is to provide an ink set and an image recording method, with which an image having excellent light fastness and excellent lamination adhesiveness with a base material for lamination, containing a polymer including vinyl chloride as a constitutional unit, can be recorded using an active energy ray curable-type ink having excellent ink jet suitability.

Another object to be achieved by still another embodiment of the present disclosure is to provide a manufacturing method of a laminate, in which a base material for lamination, containing a polymer including vinyl chloride as a constitutional unit, is laminated on an image in an image recorded material including a base material for image recording and the image, and thus a laminate having excellent lamination adhesiveness between the base material for lamination and the image can be manufactured.

The present disclosure includes the following aspects.

<1> An active energy ray curable-type ink comprising:

- a resin-coated pigment in which a pigment is coated with a vinyl chloride-vinyl acetate copolymer resin; and
- a polymerizable compound,
- in which the pigment is a magenta pigment or a yellow pigment,
- the magenta pigment is at least one selected from the group consisting of Pigment Red 146 and Pigment Red 254,
- the yellow pigment is at least one selected from the group consisting of Pigment Yellow 110, Pigment Yellow 155, Pigment Yellow 185, Pigment Yellow 138, Pigment Yellow 150, and Pigment Yellow 184,
- a content mass ratio of the vinyl chloride-vinyl acetate copolymer resin with respect to the pigment is 0.25 to 4.00, and
- in a case where a content of the pigment with respect to a total amount of the active energy ray curable-type ink is denoted as Mp % by mass and a specific gravity of the pigment is denoted as D, an Mp/D ratio is 2.00 or less.

<2> The active energy ray curable-type ink according to <1>,

- in which a mass ratio of a vinyl chloride unit with respect to a vinyl acetate unit in the vinyl chloride-vinyl acetate copolymer resin is 7.0 or less.

<3> The active energy ray curable-type ink according to <1> or <2>,

- in which the polymerizable compound contains a polymerizable monomer A which has a (meth)acryloyl group and has a solubility parameter of 16.5 $MPa^{1/2}$ to 21.3 $MPa^{1/2}$.

<4> The active energy ray curable-type ink according to any one of <1> to <3>, further comprising:

- a resin T including at least one group selected from the group consisting of a fluorinated hydrocarbon group, a polysiloxane group, and a hydrocarbon group having 12 or more carbon atoms,
- in which the resin T includes a constitutional unit derived from a polymerizable monomer having a solubility parameter of 16.5 $MPa^{1/2}$ to 24.0 $MPa^{1/2}$.

<5> An ink set comprising:

- the active energy ray curable-type ink according to any one of <1> to <4>.

<6> An image recording method comprising:

- a step of, using the active energy ray curable-type ink according to any one of <1> to <4>, applying the active energy ray curable-type ink onto a base material for image recording, containing a polymer including vinyl chloride as a constitutional unit, by an ink jet recording method to record an image.

<7> A manufacturing method of a laminate, comprising:

a step of obtaining an image recorded material including the base material for image recording and the image by the image recording method according to <6>; and a step of laminating a base material for lamination, containing a polymer including vinyl chloride as a constitutional unit, on the image of the image recorded material to obtain a laminate.

According to one embodiment of the present disclosure, there is provided an active energy ray curable-type ink which is capable of recording an image having excellent light fastness and having excellent lamination adhesiveness with a base material for lamination, containing a polymer including vinyl chloride as a constitutional unit, and which has excellent ink jet suitability.

According to another embodiment of the present disclosure, there is provided an ink set and an image recording method, with which an image having excellent light fastness and excellent lamination adhesiveness with a base material for lamination, containing a polymer including vinyl chloride as a constitutional unit, can be recorded using an active energy ray curable-type ink having excellent ink jet suitability.

According to still another embodiment of the present disclosure, there is provided a manufacturing method of a laminate, in which a base material for lamination, containing a polymer including vinyl chloride as a constitutional unit, is laminated on an image in an image recorded material including a base material for image recording and the image, and thus a laminate having excellent lamination adhesiveness between the base material for lamination and the image can be manufactured.

DESCRIPTION OF THE PREFERRED EMBODIMENTS

In the present specification, the numerical ranges shown using "to" means ranges including the numerical values described before and after "to" as the minimum value and the maximum value.

In a numerical range described in a stepwise manner in the present specification, an upper limit value or a lower limit value described in a certain numerical range may be replaced with an upper limit value or a lower limit value in another numerical range described in a stepwise manner. In addition, in the numerical range described in the present specification, an upper limit value and a lower limit value described in a certain numerical range may be replaced with values shown in Examples.

In the present specification, in a case where a plurality of substances corresponding to each component in a composition is present, the amount of each component in the composition means the total amount of the plurality of substances present in the composition, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

In the present specification, "image" denotes an entire film formed by applying a pretreatment liquid and an ink in this order, and "image recording" denotes formation of the image (that is, the film).

In addition, the concept of "image" in the present specification also includes a solid image.

In the present specification, "(meth)acrylate" is a concept including both acrylate and methacrylate. In addition, "(meth)acryl" is a concept that includes both acryl and methacryl.

Active Energy Ray Curable-Type Ink

The active energy ray curable-type ink (hereinafter, also simply referred to as "ink") according to the present disclosure contains a resin-coated pigment (hereinafter, also referred to as "vinyl chloride/acetate-coated pigment") in which a pigment is coated with a vinyl chloride-vinyl acetate copolymer resin (hereinafter, also referred to as "vinyl chloride/acetate resin") and a polymerizable compound, in which the pigment is a magenta pigment or a yellow pigment, the magenta pigment is at least one selected from the group consisting of Pigment Red 146 and Pigment Red 254, the yellow pigment is at least one selected from the group consisting of Pigment Yellow 110, Pigment Yellow 155, Pigment Yellow 185, Pigment Yellow 138, Pigment Yellow 150, and Pigment Yellow 184, a content mass ratio of the vinyl chloride/acetate resin with respect to the pigment is 0.25 to 4.00, and in a case where a content of the pigment with respect to a total amount of the active energy ray curable-type ink is denoted as Mp % by mass and a specific gravity of the pigment is denoted as D, an Mp/D ratio is 2.00 or less.

Hereinafter, Pigment Red and Pigment Yellow are also referred to as PR and PY, respectively.

With the ink according to the present disclosure, it is possible to record an image having excellent light fastness and excellent lamination adhesiveness (hereinafter, also referred to as "PVC lamination adhesiveness") with a base material for lamination, containing a polymer including vinyl chloride as a constitutional unit (hereinafter, also referred to as "PVC laminating base material"), and ink jet suitability (that is, jettability from an ink jet head in a case of being used as an ink jet ink) is excellent.

The reason why such an effect is obtained is considered as follows.

The reason why the effect that the image to be recorded has excellent PVC lamination adhesiveness is obtained is considered to be that the ink for recording the image contains the vinyl chloride/acetate-coated pigment. That is, it is considered that, in the ink, the pigment is coated with the vinyl chloride/acetate resin including a vinyl chloride unit (that is, a constitutional unit derived from vinyl chloride), so that affinity between the image and the PVC laminating base material is improved.

It is considered that this effect is obtained by setting a content mass ratio of the vinyl chloride/acetate resin with respect to the pigment (that is, a content mass ratio [vinyl chloride/acetate resin/pigment]) to be 0.25 or more.

The reason why the effect that the image to be recorded has excellent light fastness is obtained is considered to be that the pigment contained in the ink for recording the image a magenta pigment (that is, at least one selected from the group consisting of PR146 and PR254; hereinafter, also referred to as a specific magenta pigment) or a yellow pigment (that is, at least one selected from the group consisting of PY110, PY155, PY185, PY138, PY150, and PY184; hereinafter, also referred to as a specific yellow pigment), each of which has excellent light fastness.

The reason why the effect that the ink has excellent ink jet suitability is obtained is considered to be that the specific magenta pigment described above has excellent color developability among magenta pigments, and the specific yellow pigment described above has excellent color developability among yellow pigments. That is, it is considered that, since the pigment has excellent color developability, the content of the pigment in the ink can be reduced (specifically, the Mp/D ratio can be set to 2.00 or less), and thus the ink jet suitability is improved.

It is considered that the fact that the content mass ratio ([vinyl chloride/acetate resin/pigment]) is 4.00 or less also contributes to the effect that the ink has excellent ink jet suitability.

Hereinafter, the ink according to the present disclosure will be described in more detail.

Vinyl Chloride/Acetate-Coated Pigment

The ink according to the present disclosure contains at least one of the vinyl chloride/acetate-coated pigment.

As described above, the vinyl chloride/acetate-coated pigment is a resin-coated pigment in which the pigment is coated with the vinyl chloride/acetate resin (that is, a vinyl chloride-vinyl acetate copolymer resin).

In other words, the vinyl chloride/acetate-coated pigment contains the pigment and the vinyl chloride/acetate resin coating the pigment.

In the vinyl chloride/acetate-coated pigment, the pigment may be directly coated with the vinyl chloride/acetate resin, or may be coated with the vinyl chloride/acetate resin through other components (for example, a pigment dispersion resin other than the vinyl chloride/acetate resin).

Pigment

The pigment in the vinyl chloride/acetate-coated pigment is the above-described specific magenta pigment (that is, at least one selected from the group consisting of PR146 and PR254) or the above-described specific yellow pigment (that is, at least one selected from the group consisting of PY110, PY155, PY185, PY138, PY150, and PY184).

As described above, both the specific magenta pigment and the specific yellow pigment are pigments having excellent light fastness and excellent color developability.

Since both the specific magenta pigment and the specific yellow pigment are pigments having excellent color developability, a content of the pigment in the ink can be reduced. Specifically, by using the specific magenta pigment or the specific yellow pigment as the pigment, in a case where a content of the pigment with respect to the total amount of the ink is denoted as Mp % by mass and a specific gravity of the pigment is denoted as D, an Mp/D ratio can be 2.00 or less. The ink jet suitability of the ink is ensured by setting the Mp/D ratio to be 2.00 or less.

The lower limit of the Mp/D ratio is not particularly limited, but from the viewpoint of optical density of the image, or the like, it is preferably 0.90 or more.

A content of the pigment (that is, the specific magenta pigment or the specific yellow pigment) with respect to the total amount of the ink (that is, Mp described above) is preferably 0.10% by mass to 8.00% by mass and more preferably 0.50% by mass to 7.00% by mass with respect to the total amount of the ink.

In a case where the ink contains the specific magenta pigment, a content of the specific magenta pigment with respect to the total amount of the ink (that is, Mp described above) is still more preferably 0.50% by mass to 3.50% by mass and even more preferably 1.00% by mass to 3.00% by mass.

In a case where the ink contains the specific magenta pigment, the content of the specific magenta pigment in the ink may be adjusted in a range in which an optical density (OD) of a solid image recorded with an ink application amount of 6 $g/m^2$ is 0.8 or more.

In a case where the ink contains the specific yellow pigment, a content of the specific yellow pigment with respect to the total amount of the ink (that is, Mp described above) is still more preferably 0.50% by mass to 6.00% by mass, even more preferably 1.00% by mass to 5.00% by mass, and even still more preferably 1.00% by mass to 4.00% by mass.

In a case where the ink contains the specific yellow pigment, the content of the specific yellow pigment in the ink may be adjusted in a range in which an optical density (OD) of a solid image recorded with an ink application amount of 6 $g/m^2$ is 0.6 or more.

Vinyl Chloride/Acetate Resin

The vinyl chloride/acetate resin in the vinyl chloride/acetate-coated pigment is a vinyl chloride-vinyl acetate copolymer resin.

The vinyl chloride/acetate resin includes a vinyl chloride unit (that is, a constitutional unit derived from vinyl chloride) and a vinyl acetate unit (that is, a constitutional unit derived from vinyl acetate).

From the viewpoint of ink jet suitability, a mass ratio of the vinyl chloride unit to the vinyl acetate unit in the vinyl chloride/acetate resin (hereinafter, also referred to as "vinyl chloride/vinyl acetate ratio") is preferably 9.0 or less and more preferably 7.0 or less.

From the viewpoint of PVC lamination adhesiveness, the lower limit of the vinyl chloride/vinyl acetate ratio is preferably 1.0 and more preferably 1.5.

The vinyl acetate resin may include other constitutional units in addition to the vinyl chloride unit and the vinyl acetate unit, but a ratio of the total of the vinyl chloride unit and the vinyl acetate unit in the total amount of the vinyl chloride/acetate resin (or all constitutional units in the vinyl chloride/acetate resin) is preferably 80% by mass or more.

A weight-average molecular weight (Mw) of the vinyl chloride/acetate resin is preferably 5,000 to 100,000 and more preferably 10,000 to 80,000.

In the present disclosure, the weight-average molecular weight is measured by gel permeation chromatography (GPC). For example, HLC-8220GPC (manufactured by Tosoh Corporation) is used as GPC, three columns of TSKgel, SuperMultipore HZ-H (manufactured by Tosoh Corporation; 4.6 mmID×15 cm) are used as a column, and tetrahydrofuran (THF) is used as an eluent. As the conditions, a sample concentration of 0.45% by mass, a flow rate of 0.35 ml/min, a sample injection amount of 10 μl, and a measurement temperature of 40° C. are set, and a differential refractive index (RI) detector is used for detection. A calibration curve is obtained from, as a standard sample, eight samples of product names "TSK Standard polystyrene" manufactured by Tosoh Corporation: "F-40", "F-20", "F-4", "F-1", "A-5000", "A-2500", "A-1000", and "n-propylbenzene".

A glass transition temperature (Tg) of the vinyl chloride/acetate resin is preferably 20° C. to 150° C., more preferably 40° C. to 100° C., and still more preferably 50° C. to 90° C.

In the present disclosure, the glass transition temperature is measured using a differential scanning calorimeter, for example, using a product name "DSC-60" manufactured by Shimadzu Corporation.

In the vinyl chloride/acetate-coated pigment, a content mass ratio of the vinyl chloride/acetate resin to the pigment (that is, the specific magenta pigment or the specific yellow pigment) (that is, a content mass ratio [vinyl chloride/acetate resin/pigment]) is 0.25 to 4.00.

In a case where the content mass ratio [vinyl chloride/acetate resin/pigment] is 0.25 or more, the PVC lamination adhesiveness of the image is improved.

In a case where the content mass ratio [vinyl chloride/acetate resin/pigment] is 4.00 or less, the ink jet suitability of the ink is improved.

The content mass ratio [vinyl chloride/acetate resin/pigment] is preferably 0.30 to 3.50, more preferably 0.50 to 3.00, still more preferably 0.80 to 2.00, still more preferably 0.60 to 1.20, and even more preferably 0.80 to 1.00.

Other Pigment Dispersion Resins

The vinyl chloride-vinyl acetate resin in the above-described vinyl chloride/acetate-coated pigment functions as a pigment dispersion resin because the pigment is coated with the vinyl chloride/acetate resin.

The vinyl chloride/acetate-coated pigment may contain a pigment dispersion resin other than the vinyl chloride/acetate resin.

Examples of one preferred aspect of the vinyl chloride/acetate-coated pigment include an aspect in which the pigment is coated with the vinyl chloride/acetate resin through other pigment dispersion resins (that is, an aspect in which the pigment is coated with the other pigment dispersion resins and the vinyl chloride/acetate resin is coated thereon).

The vinyl chloride/acetate-coated pigment of such an aspect can be produced by, first, dispersing the pigment in a Pigment dispersion liquid using the other pigment dispersion resins, and then adding the vinyl chloride/acetate resin to the pigment dispersion liquid and performing a dispersion treatment.

Examples of the other pigment dispersion resins include a (meth)acrylic resin, a polyester resin, and a polyurethane resin.

As the other pigment dispersion resins, commercially available products may be used.

Examples of the commercially available product thereof include DISPERBYK series manufactured by BYK, and Solsperse series manufactured by Lubrizol Japan Ltd.

For the other pigment dispersion resins, descriptions described in paragraphs 0113 and 0114 of JP5547018B can be referred to as appropriate.

In a case where the vinyl chloride/acetate-coated pigment contains the other pigment dispersion resins, a content mass ratio of the other pigment dispersion resins with respect to the pigment (that is, the specific magenta pigment or the specific yellow pigment) (that is, a content mass ratio [other pigment dispersion resins/pigment]) is preferably 0.01 to 1.00 and more preferably 0.03 to 0.50.

Polymerizable Compound

The ink according to the present disclosure contains at least one polymerizable compound.

It is sufficient that the polymerizable compound is a compound including a polymerizable group, and the polymerizable compound is preferably a compound including an ethylenically unsaturated group as the polymerizable group.

The ethylenically unsaturated group is preferably a vinyl group, an allyl group, or a (meth)acryloyl group.

A molecular weight of the polymerizable compound is preferably 1,000 or less, more preferably 500 or less, and still more preferably 300 or less.

Hereinafter, a polymerizable compound having a molecular weight of 1,000 or less may be referred to as a polymerizable monomer.

A proportion of the polymerizable compound (preferably, the polymerizable monomer) with respect to the total amount of the ink is preferably 50% by mass or more, more preferably 60% by mass or more, still more preferably 70% by mass or more, and even more preferably 80% by mass or more.

Polymerizable Monomer A

The polymerizable compound in the ink according to the present disclosure preferably includes a polymerizable monomer A which has a (meth)acryloyl group has a solubility parameter of 16.5 $MPa^{1/2}$ to 21.3 $MPa^{1/2}$.

The SP value of the polymerizable monomer A is 16.5 $MPa^{1/2}$ to 21.3 $MPa^{1/2}$.

As a result, polymerization of the polymerizable monomer A proceeds in a state in which the ink is moderately immersed in the base material for image recording, and an image having excellent adhesiveness to the base material for image recording is obtained, whereby excellent laminating peeling strength is achieved.

The SP value of the polymerizable monomer A is preferably 18 $MPa^{1/2}$ to 19.5 $MPa^{1/2}$.

In the present disclosure, the SP value (that is, the solubility parameter) of the polymerizable monomer A means a Hansen solubility parameter.

The Hansen solubility parameters are obtained by dividing the solubility parameters introduced by Hildebrand into three components, a dispersion element δd, a polarity element δp, and a hydrogen bond element δh, and expressing the parameters in a three-dimensional space.

The SP value δ of the polymerizable monomer A is a value calculated by the following expression (A).

$$\text{SP value}(\delta)[MPa^{1/2}]=(\delta d^2+\delta p^2+\delta h^2)^{1/2} \quad (A)$$

The dispersion element δd, the polarity element δp, and the hydrogen bond element δh are calculated using HSPiP (version 4.1.07) software.

The polymerizable monomer A has a (meth)acryloyl group (preferably an acryloyl group).

As a result, the polymerizable monomer A has excellent polymerizability. As a result, the ink has excellent curing properties.

From the viewpoint of further improving the curing properties of the ink (that is, viewpoint that the polymerizable monomer A has polymerizability), the polymerizable monomer A preferably has a (meth)acryloyloxy group (preferably an acryloyloxy group).

The number of (meth)acryloyl groups included in the polymerizable monomer A may be only 1 or 2 or more, but is preferably only 1.

A molecular weight of the polymerizable monomer A is preferably 215 or less.

As a result, the ink is more likely to be immersed in the base material for image recording, so that the adhesiveness of the image to the base material for image recording is further improved. Furthermore, since a distance between crosslinking points is shortened, a density of the ink film is further improved. As a result, the laminating peeling strength is further improved.

The molecular weight of the polymerizable monomer A is more preferably 205 or less and still more preferably 200 or less.

Examples of the polymerizable monomer A include the following compounds.

Tetrahydrofurfuryl acrylate (SP value: 18.8 $MPa^{1/2}$)

Cyclic trimethylolpropane formal acrylate (SP value: 19.0 $MPa^{1/2}$)

Etoxyethyethygolicol acrylate (SP value: 18.2 $MPa^{1/2}$)

Cyclohexyl acrylate (SP value: 17.9 $MPa^{1/2}$)

Isobornyl acrylate (SP value: 17.1 $MPa^{1/2}$)

Phenoxyethyl acrylate (SP value: 19.44 $MPa^{1/2}$)

N,N-Dimethylacrylamide (SP value: 21.4 $MPa^{1/2}$)

4-tert-Butylcyclohexyl acrylate (SP value: 16.7 $MPa^{1/2}$)

3,3,5-Trimethylcyclohexyl acrylate (SP value: 16.7 $MPa^{1/2}$)

4-Hydroxydibutyl acrylate (SP value: 21.0 $MPa^{1/2}$)

2-Methyl-2-ethyl-1,3-dioxolan-4-yl)methyl acrylate (SP value: 18.2 $MPa^{1/2}$)

Benzyl acrylate (SP value: 19.0 $MPa^{1/2}$)

(3-Ethoxytetan-3-yl)methyl acrylate (SP value: 18.6 $MPa^{1/2}$)

2-Oxotetrahydrofuran-3-yl acrylate (SP value: 21.2 $MPa^{1/2}$)

Lauryl acrylate (SP value: 16.7 $MPa^{1/2}$)

Among these, from the viewpoint of improving the adhesiveness to the base material for image recording and the adhesiveness to the base material for lamination, the polymerizable monomer A preferably includes at least one selected from the group consisting of tetrahydrofurfuryl acrylate, cyclic trimethylolpropane formal acrylate, cyclohexyl acrylate, and etoxyethyethygolicol acrylate; more preferably includes at least one selected from the group consisting of cyclic trimethylolpropane formal acrylate, cyclohexyl acrylate, and etoxyethyethygolicol acrylate; and still more preferably includes at least one selected from the group consisting of cyclohexyl acrylate and etoxyethyethygolicol acrylate.

A content of the polymerizable monomer A is preferably 30% by mass to 75% by mass, more preferably 40% by mass to 70% by mass, and still more preferably 44% by mass to 63% by mass with respect to the total amount of the ink.

N-Vinyl Compound

The polymerizable compound in the ink according to the present disclosure preferably contains at least one kind of N-vinyl compound.

As a result, the adhesiveness between the image and the base material for image recording is further improved, accordingly, the laminating peeling strength is further improved.

The N-vinyl compound is a compound in which a vinyl group is bonded to a nitrogen atom, and is classified as a polymerizable monomer.

Same as the polymerizable monomer A, the N-vinyl compound is a compound having an SP value corresponding to 16.5 $MPa^{1/2}$ to 21.3 $MPa^{1/2}$. Therefore, the N-vinyl compound contributes to the adhesiveness between the base material for image recording and the image.

Examples of the N-vinyl compound include N-vinylpyrrolidone, N-vinylcaprolactam, N-vinylcarbazole, N-vinylimidazole, N-vinylphthalimide, N-vinylacetamide, N-vinylformamide, and 5-methyl-3-vinyl-2-oxazolidinone.

Among these, from the viewpoint of high solubility in the base material for image recording and improvement of the adhesiveness between the base material for image recording and the image, the N-vinyl compound is preferably at least one selected from the group consisting of N-vinylcaprolactam and 5-methyl-3-vinyl-2-oxazolidinone.

A content of the N-vinyl compound is preferably 10% by mass to 50% by mass, more preferably 15% by mass to 40% by mass, and still more preferably 20% by mass to 30% by mass with respect to the total amount of the ink.

A mass ratio of the content of the N-vinyl compound with respect to the content of the polymerizable monomer A is preferably 0.30 or more, more preferably 0.35 or more, and still more preferably 0.50 or more. In a case where the above-described mass ratio is 0.30 or more, the curing properties of the ink are improved, and the adhesiveness between the image and the base material for lamination is further improved.

The N-vinyl compound tends to have a high glass transition temperature in a case of being a homopolymer. Therefore, the upper limit value of the above-described mass ratio is not particularly limited, but from the viewpoint of obtaining thermal plasticity in the ink film, the mass ratio of the content of the N-vinyl compound with respect to the content of the polymerizable monomer A is preferably 0.30 to 0.80, more preferably 0.35 to 0.75, and still more preferably 0.5 to 0.70.

A proportion of the total of the polymerizable monomer A and the N-vinyl compound with respect to all polymerizable compounds contained in the ink is preferably 80% by mass or more and more preferably 90% by mass or more. The upper limit value of the above-described proportion is not particularly limited, and the above-described proportion may be 100% by mass. That is, all polymerizable compounds contained in the ink may be the polymerizable monomer A and the N-vinyl compound.

A proportion of the total of the polymerizable monomer A and the N-vinyl compound with respect to the total amount of the ink is preferably 50% by mass or more, more preferably 60% by mass or more, still more preferably 70% by mass or more, and even more preferably 80% by mass or more.

Other Polymerizable Monomers

The ink according to the present disclosure may contain a polymerizable monomer in addition to the polymerizable monomer A and the N-vinyl compound as other polymerizable monomers (hereinafter, also referred to as "other monomers").

A polymerizable group included in the other polymerizable monomers is preferably a radically polymerizable group, more preferably a photoradically polymerizable group, and still more preferably an ethylenically unsaturated group. Examples of the other polymerizable monomers include a (meth)acrylate compound, a (meth)acrylamide compound, a vinyl ether compounds, an allyl compound, and an unsaturated carboxylic acid.

Proportion of Polymerizable Monomer Having Molecular Weight of 205 or Less

A proportion of the polymerizable monomer having a molecular weight of 205 or less with respect to all polymerizable compounds contained in the ink according to the present disclosure is preferably 80% by mass or more and more preferably 90% by mass or more. In a case where the above-described proportion is 80% by mass or more, the solubility of the ink in the base material for image recording is high, and the adhesiveness between the base material for image recording and the image is improved. The upper limit value of the above-described proportion is not particularly limited, and the above-described proportion may be 100% by mass. That is, all polymerizable compounds contained in the ink may be the polymerizable monomer having a molecular weight of 205 or less.

The proportion of the polymerizable monomer having a molecular weight of 205 or less with respect to the total amount of the ink is preferably 50% by mass or more, more preferably 60% by mass or more, still more preferably 70% by mass or more, and even more preferably 80% by mass or more.

Proportion of Monofunctional Polymerizable Monomer

A proportion of a monofunctional polymerizable monomer (that is, a polymerizable monomer having one polymerizable group; the same applies hereinafter) with respect to all polymerizable compounds contained in the ink is preferably 90% by mass or more, and more preferably 92% by mass or more. In a case where the above-described proportion is 90% by mass or more, cure shrinkage due to residual stress is suppressed, and the adhesiveness between the base material for image recording and the image is improved. The upper limit value of the above-described proportion is not particularly limited, and the above-described proportion may be 100% by mass. That is, all polymerizable compounds contained in the ink may be the monofunctional polymerizable monomer.

The proportion of the monofunctional polymerizable monomer with respect to the total amount of the ink is preferably 50% by mass or more, more preferably 60% by mass or more, still more preferably 70% by mass or more, and even more preferably 80% by mass or more.

Weighted Average Value of Glass Transition Temperatures in Case of being Used as Homopolymer A weighted average value of glass transition temperatures in a case where all polymerizable monomers contained in the ink are respectively homopolymers is preferably 0° C. to 100° C., more preferably 5° C. to 50° C., and still more preferably 10° C. to 30° C.

In a case where the above-described weighted average value is 0° C. to 100° C., since the ink film (that is, the image) obtained by curing the ink has more excellent thermal plasticity, the adhesiveness between the image and the base material for lamination is further improved.

The glass transition temperature in a case where the polymerizable monomer is homopolymerized is measured by the following method. The "polymerizable monomer" herein refers to a compound having a polymerizable group and having a molecular weight of 1,000 or less.

First, a homopolymer having a weight-average molecular weight of 10,000 to 20,000 is produced using the polymerizable monomer. A glass transition temperature of the produced homopolymer is measured according to the method described in JIS K 7121:2012.

The glass transition temperature of the homopolymer varies depending on the weight-average molecular weight of the homopolymer, but the variation is negligibly small in a case where the weight-average molecular weight is 10,000 to 20,000.

The weighted average value of the glass transition temperatures is calculated by the following expression.

In the expression, $T_i$ represents a glass transition temperature in a case where an i-th polymerizable monomer contained in the ink is a homopolymer, and $C_i$ represents a content (% by mass) of the i-th polymerizable monomer with respect to the total amount of the ink.

$$\text{Weighted average value of glass transition temperatures} = \Sigma T_i C_i / \Sigma C_i$$

Polymerization Initiator

The ink according to the present disclosure preferably contains at least one polymerization initiator.

As the polymerization initiator, a photoradical polymerization initiator which absorbs light to generate a radical as a polymerization initiation species is preferable.

Examples of the polymerization initiator include an alkylphenone compound, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a carbon halogen bond-containing compound, and an alkylamine compound.

Among these, as the polymerization initiator, at least one compound selected from the group consisting of an acylphosphine compound and a thio compound is preferable, and at least one compound selected from the group consisting of an acylphosphine oxide compound and a thioxanthone compound is preferable. It is still more preferable to use an acylphosphine oxide compound and a thioxanthone compound in combination.

Examples of the acylphosphine oxide compound include a monoacylphosphine oxide compound and a bisacylphosphine oxide compound. The acylphosphine oxide compound is preferably a bisacylphosphine oxide compound.

Examples of the monoacylphosphine oxide compound include isobutyryl diphenylphosphine oxide, 2-ethylhexanoyldiphenylphosphine oxide, 2,4,6-trimethylbenzoyldiphenylphosphine oxide, (2,4,6-trimethylbenzoyl)ethoxyphenylphosphine oxide, o-toluyldiphenylphosphine oxide, p-t-butylbenzoyldiphenylphosphine oxide, 3-pyridylcarbonyldiphenylphosphine oxide, acryloyl diphenylphosphine oxide, benzoyl diphenylphosphine oxide, pivaloyl phenylphosphinic acid vinyl ester, adipoyl bisdiphenylphosphine oxide, pivaloyl diphenylphosphine oxide, p-toluyldiphenylphosphine oxide, 4-(t-butyl) benzoyldiphenylphosphine oxide, terephthaloyl bisdiphenylphosphine oxide, 2-methylbenzoyldiphenylphosphine oxide, versatoyl diphenylphosphine oxide, 2-methyl-2-ethylhexanoyldiphenylphosphine oxide, 1-methyl-cyclohexanoyldiphenylphosphine oxide, pivaloyl phenylphosphinic acid methyl ester, and pivaloyl phenylphosphinic acid isopropyl ester.

Examples of the bisacylphosphine oxide compound include bis(2,6-dichlorobenzoyl)phenylphosphine oxide,
bis(2,6-dichlorobenzoyl)-2,5-dimethylphenylphosphine oxide,
bis(2,6-dichlorobenzoyl)-4-ethoxyphenylphosphine oxide,
bis(2,6-dichlorobenzoyl)-4-propylphenylphosphine oxide,
bis(2,6-dichlorobenzoyl)-2-naphthylphosphine oxide,
bis(2,6-dichlorobenzoyl)-1-naphthylphosphine oxide,
bis(2,6-dichlorobenzoyl)-4-chlorophenylphosphine oxide,
bis(2,6-dichlorobenzoyl)-2,4-dimethoxyphenylphosphine oxide,
bis(2,6-dichlorobenzoyl)decylphosphine oxide,
bis(2,6-dichlorobenzoyl)-4-octylphenylphosphine oxide,
bis(2,4,6-trimethylbenzoyl)phenylphosphine oxide,
bis(2,4,6-trimethylbenzoyl)-2,5-dimethylphenylphosphine oxide,
bis(2,6-dichloro-3,4,5-trimethoxybenzoyl)-2,5-dimethylphenylphosphine oxide,
bis(2,6-dichloro-3,4,5-trimethoxybenzoyl)-4-ethoxyphenylphosphine oxide,
bis(2-methyl-1-naphthoyl)-2,5-dimethylphenylphosphine oxide,
bis(2-methyl-1-naphthoyl)-4-ethoxyphenylphosphine oxide,
bis(2-methyl-1-naphthoyl)-2-naphthylphosphine oxide,
bis(2-methyl-1-naphthoyl)-4-propylphenylphosphine oxide,
bis(2-methyl-1-naphthoyl)-2,5-dimethylphenylphosphine oxide,
bis(2-methoxy-1-naphthoyl)-4-ethoxyphenylphosphine oxide,
bis(2-chloro-1-naphthoyl)-2,5-dimethylphenylphosphine oxide, and
bis(2,6-dimethoxybenzoyl)-2,4,4-trimethylpentylphosphine oxide.

Among these, as the acylphosphine oxide compound, it is preferable to include at least one selected from the group consisting of bis(2,4,6-trimethylbenzoyl)phenylphosphine oxide (product name "Omnirad 819", manufactured by IGM Resins B.V.) and 2,4,6-trimethylbenzoyldiphenylphosphine oxide (product name "Omnirad TPO-H", manufactured by IGM Resins B.V.).

Examples of the thioxanthone compound include thioxanthone, 2-isopropylthioxanthone,
4-isopropylthioxanthone, 2-chlorothioxanthone, 2,4-dichlorothioxanthone,
2-dodecylthioxanthone, 2,4-diethylthioxanthone, 2,4-dimethylthioxanthone,
1-methoxycarbonylthioxanthone, 2-ethoxycarbonylthioxanthone,
3-(2-methoxyethoxycarbonyl)thioxanthone, 4-butoxycarbonylthioxanthone,
3-butoxycarbonyl-7-methylthioxanthone, 1-cyano-3-chlorothioxanthone,
1-ethoxycarbonyl-3-chlorothioxanthone, 1-ethoxycarbonyl-3-ethoxythioxanthone,
1-ethoxycarbonyl-3-aminothioxanthone, 1-ethoxycarbonyl-3-phenylsulfylthioxanthone,
3,4-di[2-(2-methoxyethoxy)ethoxycarbonyl]thioxanthone,
1-ethoxycarbonyl-3-(1-methyl-1-morpholinoethyl)thioxanthone,
2-methyl-6-dimethoxymethylthioxanthone, 2-methyl-6-(1,1-dimethoxybenzyl)thioxanthone,
2-morpholinomethylthioxanthone, 2-methyl-6-morpholinomethylthioxanthone,
n-allylthioxanthone-3,4-dicarboxyimide, n-octylthioxanthone-3,4-dicarboxyimide,
N-(1,1,3,3-tetramethylbutyl)thioxanthone-3,4-dicarboxyimide, 1-phenoxythioxanthone,
6-ethoxycarbonyl-2-methoxythioxanthone, 6-ethoxycarbonyl-2-methylthioxanthone,
thioxanthone-2-polyethylene glycol ester, and
2-hydroxy-3-(3,4-dimethyl-9-oxo-9H-thioxanthone-2-yloxy)-N,N,N-trimethyl-1-propaneaminium chloride.

The thioxanthone compound may be a commercially available product. Examples of the commercially available product include SPEEDCURE series (for example, SPEEDCURE 7010, SPEEDCURE CPTX, SPEEDCURE ITX, and the like) manufactured by Lambson.

In a case where the ink contains a polymerization initiator, from the viewpoint of improving the curing properties of the ink, a content of the polymerization initiator is preferably 2% by mass or more and more preferably 5% by mass or more with respect to the total amount of the ink. The upper limit of the content of the polymerization initiator is not particularly limited, but for example, it is 10% by mass.

Surfactant

The ink may contain at least one surfactant. However, from the viewpoint of improving the affinity between the base material for image recording and the ink, it is preferable that the ink does not contain a surfactant, or a content of the surfactant with respect to the total amount of the ink is less than 0.1% by mass. In a case where the ink contains a surfactant, as the surfactant, a generally known surfactant can be used.

Polymerization Inhibitor

The ink according to the present disclosure preferably contains at least one polymerization inhibitor.

Examples of the polymerization inhibitor include p-methoxyphenol, quinones (for example, hydroquinone, benzoquinone, and methoxybenzoquinone), phenothiazine, catechols, alkylphenols (for example, dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine)aluminum salt (also known as Cupferron Al).

Among these, as the polymerization inhibitor, it is preferable to include at least one selected from the group consisting of p-methoxyphenol, catechols, quinones, alkylphenols, TEMPO, TEMPOL, and tris(N-nitroso-N-phenylhydroxylamine)aluminum salt; and it is more preferable to include at least one selected from the group consisting of p-methoxyphenol, hydroquinone, benzoquinone, BHT, TEMPO, TEMPOL, and tris(N-nitroso-N-phenylhydroxylamine)aluminum salt.

In a case where the ink contains a polymerization inhibitor, a content of the polymerization inhibitor is preferably 0.01% by mass to 2.0% by mass, more preferably 0.02% by mass to 1.0% by mass, and still more preferably 0.03% by mass to 0.5% by mass with respect to the total amount of the ink.

Resin

The ink according to the present disclosure may contain at least one resin.

The resin herein means a resin other than the resin in the resin-coated pigment (that is, a resin contained in the outside of the vinyl chloride/acetate-coated pigment).

Examples of the resin include an epoxy resin, a vinyl chloride-based resin, a polyester resin, a (meth)acrylic resin, a urethane resin, chlorinated polyolefin, and polyketone.

The vinyl chloride-based resin means a polymer including vinyl chloride as a constitutional unit. The vinyl chloride-based resin may be a homopolymer of vinyl chloride (that is, polyvinyl chloride), or may be a copolymer including vinyl chloride and a monomer other than the vinyl chloride as a constitutional unit.

Examples of the (meth)acrylic resin include a copolymer of methyl methacrylate and n-butyl methacrylate.

The urethane resin means a polymer having a urethane bond in the main chain. The urethane resin is produced, for example, by reacting a polyisocyanate compound with a polyol compound.

The ink according to the present disclosure preferably contains a resin T including at least one group selected from the group consisting of a fluorinated hydrocarbon group, a polysiloxane group, and a hydrocarbon group having 12 or more carbon atoms.

In a case where the resin includes at least one group selected from the group consisting of a fluorinated hydrocarbon group, a polysiloxane group, and a hydrocarbon group having 12 or more carbon atoms, the solubility of the ink in the base material for image recording is increased, and the adhesiveness between the base material for image recording and the image is improved.

The fluorinated hydrocarbon group means a hydrocarbon group substituted with at least one fluorine atom.

Examples of the fluorinated hydrocarbon group include a fluorinated alkyl group, a fluorinated alkenyl group, and a fluorinated aryl group.

As the fluorinated hydrocarbon group, a fluorinated alkyl group is preferable, and a perfluoroalkyl group is particularly preferable.

The number of fluorine atoms in the fluorinated hydrocarbon group is preferably 6 or more and more preferably 8 or more. The upper limit of the number of fluorine atoms in the fluorinated hydrocarbon group is not particularly limited, and examples thereof include 40.

The number of carbon atoms in the fluorinated hydrocarbon group is preferably 3 or more and more preferably 4 or more. The upper limit of the number of carbon atoms in the fluorinated hydrocarbon group is not particularly limited, and examples thereof include 20.

Examples of the hydrocarbon group having 12 or more carbon atoms include an alkyl group, an alkenyl group, an aryl group, an alkylaryl group, and an aralkyl group. As the hydrocarbon group having 12 or more carbon atoms, an alkyl group is particularly preferable.

The number of carbon atoms in the hydrocarbon group having 12 or more carbon atoms is preferably 14 or more and more preferably 16 or more.

The upper limit of the number of carbon atoms in the hydrocarbon group having 12 or more carbon atoms is not particularly limited, and examples thereof include 30.

The polysiloxane group means a divalent group including a repetition of an Si—O bond.

The specific resin more preferably includes a monovalent group including a polysiloxane group.

Examples of the monovalent group including a polysiloxane group include the following group (P).

(P)

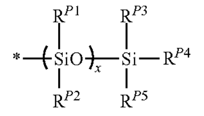

In the group (P), $R^{P1}$ and $R^{P2}$ each independently represent a hydrocarbon group having 1 to 6 carbon atoms or the following group (Z), $R^{P3}$ to $R^{P5}$ each independently represent a hydrocarbon group having 1 to 6 carbon atoms, x represents an integer of 1 to 100, and * represents a bonding position.

In a case where x is an integer of 2 or more, a plurality of $R^{P1}$'s may be the same or different from each other, and a plurality of $R^{P2}$'s may be the same or different from each other.

In the group (P), the number of Si—O bonds (that is, siloxane bonds) is 2 or more.

(Z)

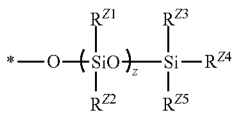

In the group (Z), $R^{Z1}$ to $R^{Z5}$ each independently represent a hydrocarbon group having 1 to 6 carbon atoms, z represents an integer of 0 to 100, and * represents a bonding position.

In a case where z is an integer of 2 or more, a plurality of $R^{Z1}$'s may be the same or different from each other, and a plurality of $R^{Z2}$'s may be the same or different from each other.

x in the group (P) is preferably an integer of 1 to 50, more preferably an integer of 1 to 20, and particularly preferably an integer of 1 to 10.

In the group (P), as the hydrocarbon groups having 1 to 6 carbon atoms in $R^{P1}$ to $R^{P5}$, a methyl group, an ethyl group, or a phenyl group is preferable, a methyl group or a phenyl group is more preferable, and a methyl group is particularly preferable.

z in the group (Z) is preferably an integer of 0 to 50, more preferably an integer of 0 to 20, and particularly preferably an integer of 0 to 10.

In the group (Z), as the hydrocarbon groups having 1 to 6 carbon atoms in $R^{Z1}$ to $R^{Z5}$, a methyl group, an ethyl group, or a phenyl group is preferable, a methyl group or a phenyl group is more preferable, and a methyl group is particularly preferable.

Constitutional unit (1) including at least one selected from group consisting of fluorinated hydrocarbon group, polysiloxane group, and hydrocarbon group having 12 or more carbon atoms It is preferable that the resin T includes at least one constitutional unit (1) including at least one selected from the group consisting of a fluorinated hydrocarbon group, a polysiloxane group, and a hydrocarbon group having 12 or more carbon atoms.

Examples of the constitutional unit (1) include a constitutional unit derived from a vinyl monomer (for example, (meth)acrylic acid ester, (meth)acrylamide, or the like), a constitutional unit derived from a diol compound, and a constitutional unit derived from a diisocyanate compound.

As the constitutional unit (1), a constitutional unit derived from a (meth)acrylic acid ester is preferable, and the following constitutional unit (1A) is more preferable.

(1A)

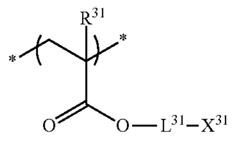

In the constitutional unit (1A), $R^{31}$ represents a hydrogen atom or a methyl group, $L^{31}$ represents a single bond or a linking group, $X^{31}$ represents a fluorinated hydrocarbon group, a monovalent group including a polysiloxane group, or a hydrocarbon group having 12 or more carbon atoms, and two * represent a bonding position.

The preferred aspects of the fluorinated hydrocarbon group, the monovalent group including a polysiloxane group, and the hydrocarbon group having 12 or more carbon atoms in $X^{31}$ are as described above, respectively.

$R^{31}$ represents a hydrogen atom or a methyl group, and a methyl group is preferable.

As the linking group represented by $L^{31}$, a divalent hydrocarbon group having 1 to 11 carbon atoms (more preferably having 2 to 11 carbon atoms and still more preferably having 2 to 8 carbon atoms) is preferable.

The above-described divalent hydrocarbon group may have a substituent such as a hydroxy group and an alkoxy group.

Examples of the above-described divalent hydrocarbon group include an alkylene group, an alkenylene group, an arylene group, an alkylenearylene group, an alkylenearylenealkylene group, an alkylene carbonyloxyalkylene group, and an arylene carbonyloxyalkylene group.

As the above-described divalent hydrocarbon group, an alkylene group having 1 to 11 carbon atoms (more preferably having 1 to 6 carbon atoms) is particularly preferable.

Specific examples of the constitutional unit (1A) including at least one selected from the group consisting of a fluorinated hydrocarbon group, a polysiloxane group, and a hydrocarbon group having 12 or more carbon atoms are as follows.

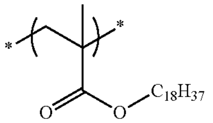
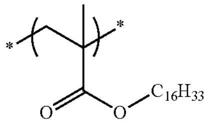
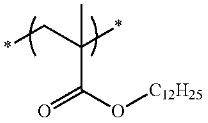
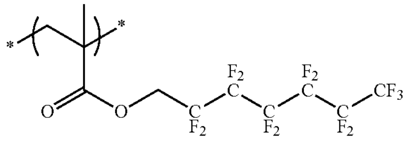
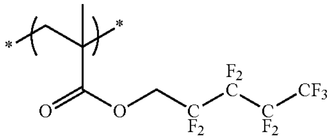
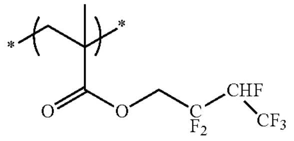
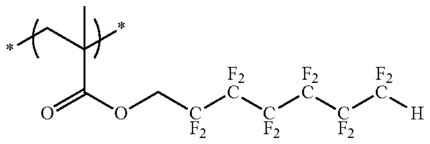
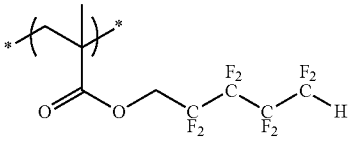
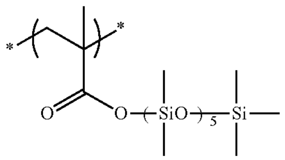
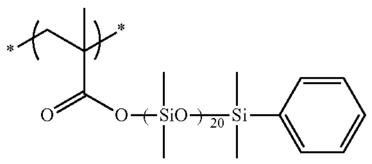
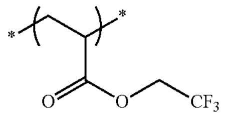
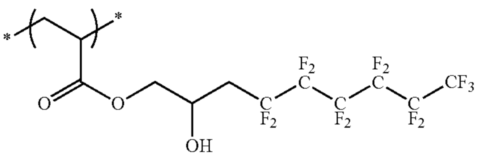

-continued

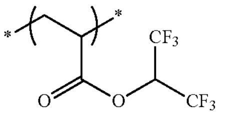
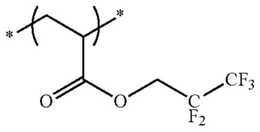
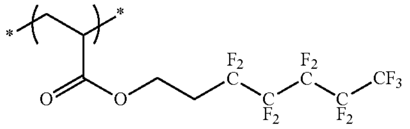

Specific examples of the constitutional unit (1) also include the following constitutional units.

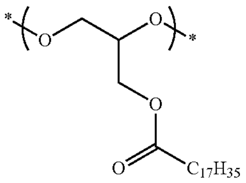

It is preferable that the resin T includes at least one constitutional unit (2) including at least one selected from the group consisting of an alkylthio group, an alkylene thioalkylene group, and a mercapto group, in addition to the above-described constitutional unit (1).

Examples of the constitutional unit (2) include an alkylthio group, an alkylene thioalkylene group, an oxyalkylene thioalkyleneoxy group (preferably having 2 to 20 carbon atoms and more preferably having 2 to 10 carbon atoms), a mercapto group, a mercaptoalkyl group (preferably having 1 to 10 carbon atoms), and a mercaptoalkylamino group (preferably having 1 to 10 carbon atoms).

From the viewpoint of further suppressing yellowing of the image, the number of carbon atoms in the alkylthio group is preferably 1 to 30, more preferably 1 to 20, still more preferably 6 to 20, and particularly preferably 10 to 20.

From the viewpoint of further suppressing the yellowing of the image, the number of carbon atoms in the alkylene thioalkylene group is preferably 2 to 20 and more preferably 2 to 10.

In addition, examples of the constitutional unit (2) also include a constitutional unit derived from a vinyl monomer including at least one selected from the group consisting of an alkylthio group, an alkylene thioalkylene group, and a mercapto group (for example, (meth)acrylic acid ester, (meth)acrylamide, and the like).

From the viewpoint of further suppressing the yellowing of the image, the constitutional unit (2) including at least one selected from the group consisting of an alkylthio group, an alkylene thioalkylene group, and a mercapto group is preferably an alkylthio group, and particularly preferably an alkylthio group as a terminal group of the main chain of the resin T.

Specific examples of the constitutional unit (2) are as follows.

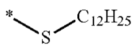
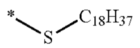
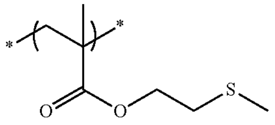

-continued

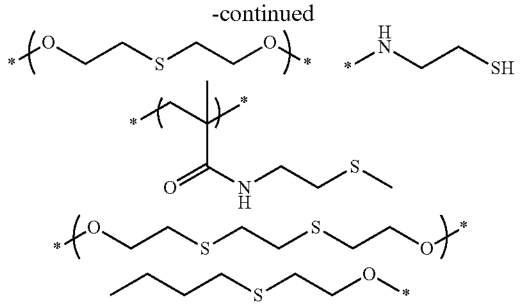

The resin T preferably includes at least one constitutional unit (3) including an amine structure having an α-hydrogen atom, in addition to the above-described constitutional unit (1).

Examples of the constitutional unit (3) include a constitutional unit derived from a vinyl monomer (for example, (meth)acrylic acid ester, (meth)acrylamide, or the like), a constitutional unit derived from a diol compound, a constitutional unit derived from a diamine compound, and a constitutional unit derived from a diisocyanate compound.

Here, the (meth)acrylic acid ester is a raw material for a (meth)acrylic resin, the diisocyanate compound is a raw material for a urethane resin or a urea resin, the diol compound is a raw material for a urethane resin, and the diamine compound is a raw material for a urea resin.

The constitutional unit (3) is preferably a constitutional unit derived from a (meth)acrylic acid ester, and more preferably the following constitutional unit (3A).

(3A)

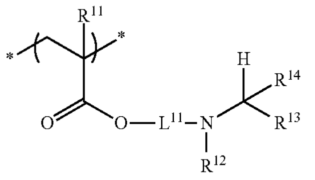

In the constitutional unit (3A), $R^{11}$ represents a hydrogen atom or a methyl group, $R^{12}$, $R^{13}$, and $R^{14}$ each independently represent a hydrogen atom or a hydrocarbon group, $L^{11}$ represents a linking group, and two * represent a bonding position. $R^{12}$ and $L^{11}$ may be linked to each other to form a ring, and $R^{12}$ and $R^{13}$ may be linked to each other to form a ring.

In the constitutional unit (3A), $R^{11}$ represents a hydrogen atom or a methyl group, and is preferably a methyl group.

In the constitutional unit (3A), the number of carbon atoms in the above-described hydrocarbon group of $R^{12}$, $R^{13}$, and $R^{14}$ is preferably 1 to 11, more preferably 1 to 6, and particularly preferably 1 to 3.

Examples of the above-described hydrocarbon group of $R^{12}$, $R^{13}$, and $R^{14}$ include an alkyl group, an alkenyl group, an aryl group, an alkylaryl group, and an aralkyl group; and an alkyl group or an aryl group is preferable and an alkyl group is more preferable.

The above-described hydrocarbon groups of $R^{12}$, $R^{13}$, and $R^{14}$ may be substituted. Examples of the substituent in this case include a hydroxy group and an alkoxy group.

From the viewpoint of further suppressing stickiness of the image, $R^{13}$ and $R^{14}$ are each independently preferably a hydrogen atom or an alkyl group having 1 to 6 carbon atoms, more preferably a hydrogen atom or an alkyl group having 1 to 3 carbon atoms, and still more preferably a hydrogen atom or a methyl group.

From the viewpoint of further suppressing the stickiness of the image, it is particularly preferable that $R^{13}$ and $R^{14}$ are both hydrogen atoms. The hydrogen atoms as $R^{13}$ and $R^{14}$ are all α-hydrogen atoms. Therefore, in a case where both $R^{13}$ and $R^{14}$ are hydrogen atoms, the number of α-hydrogen atoms in the amine structure is large, so that the function of the amine structure (that is, the function of inhibiting radical polymerization by oxygen) is more effectively exhibited. Therefore, in this case, the stickiness of the image is significantly suppressed.

From the viewpoint of further suppressing the stickiness of the image, $R^{12}$ is preferably a hydrocarbon group, more preferably an alkyl group having 1 to 6 carbon atoms, still more preferably an alkyl group having 1 to 3 carbon atoms, even more preferably a methyl group or an ethyl group, and particularly preferably a methyl group.

In a case where $R^{12}$ is a hydrocarbon group (as a more preferred aspect, the group as described above), the stickiness of the image is suppressed as compared with a case where $R^{12}$ is a hydrogen atom. The reason for this is considered to be that, in the case where $R^{12}$ is a hydrocarbon group (as a more preferred aspect, the group as described above), formation of an N—O radical is suppressed, and as a result, the function of the amine structure (that is, the function of inhibiting radical polymerization by oxygen) is more effectively exhibited.

In the constitutional unit (3A), $L^{11}$ represents a linking group.

As the linking group represented by $L^{11}$, a divalent hydrocarbon group having 1 to 11 carbon atoms (more preferably having 2 to 11 carbon atoms and still more preferably having 2 to 8 carbon atoms) is preferable.

The above-described divalent hydrocarbon group may have a substituent such as a hydroxy group and an alkoxy group.

Examples of the above-described divalent hydrocarbon group include an alkylene group, an alkenylene group, an arylene group, an alkylenearylene group, an alkylenearylenealkylene group, an alkylene carbonyloxyalkylene group, and an arylene carbonyloxyalkylene group.

As the above-described divalent hydrocarbon group, an alkylene group having 1 to 11 carbon atoms (more preferably having 1 to 6 carbon atoms) is particularly preferable. Specific examples of the constitutional unit (3) are as follows.

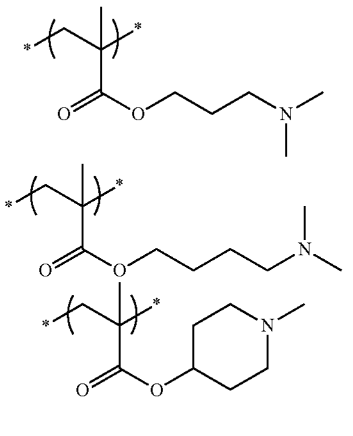

-continued

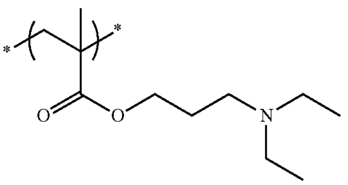

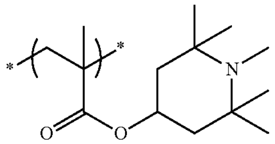

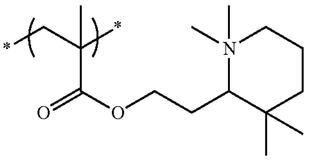

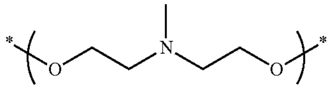

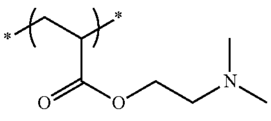

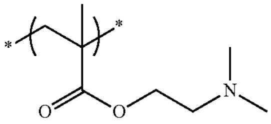

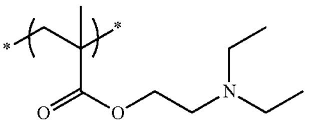

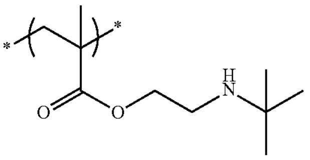

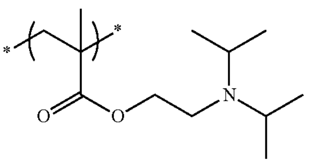

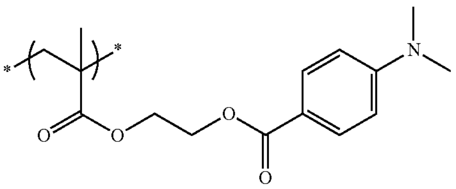

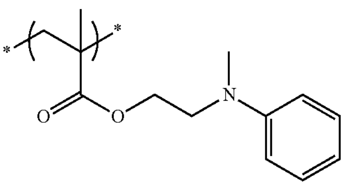

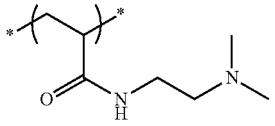

-continued

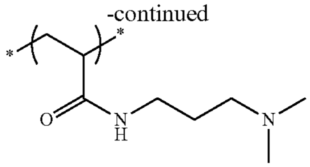

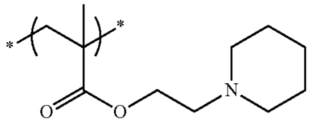

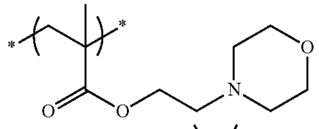

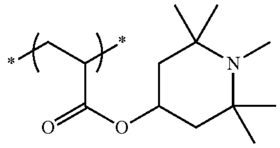

The resin T preferably includes a constitutional unit derived from a polymerizable monomer having an SP value of 16.5 $MPa^{1/2}$ to 24.0 $MPa^{1/2}$. In a case where the resin T includes a constitutional unit derived from a polymerizable monomer having an SP value of 16.5 $MPa^{1/2}$ to 24.0 $MPa^{1/2}$, at least one group selected from the group consisting of a fluorinated hydrocarbon group, a polysiloxane group, and a hydrocarbon group having 12 or more carbon atoms is aligned on a surface of the ink film, and the affinity with the laminating base material is improved.

The SP value of the polymerizable monomer contained in the resin T is measured by the same method as the SP value of the polymerizable monomer A described above.

A weight-average molecular weight (Mw) of the resin is preferably 1,000 to 70,000 and more preferably 5,000 to 50,000.

In a case where the ink contains a resin, a content of the resin is preferably 0.1% by mass to 10% by mass, more preferably 0.1% by mass to 5.0% by mass, and still more preferably 0.1% by mass to 2.0% by mass with respect to the total amount of the ink.

Solvent

The ink according to the present disclosure contains no solvent, or in a case of containing the solvent, a content of the solvent with respect to the total amount of the ink is preferably 5% by mass or less (more preferably 3% by mass or less, still more preferably 2% by mass or less, and even more preferably 1% by mass or less).

The term "solvent" herein includes both an organic solvent and an inorganic solvent (for example, water).

Other Components

The ink according to the present disclosure may contain a component other than those described above.

Examples of the other components include an ultraviolet absorber, a co-sensitizer, an antioxidant, a fading inhibitor, and a conductive salt.

With regard to the other components, reference can be appropriately made to known documents, for example, JP2011-225848A, JP2009-209352A, and the like.

Physical Properties of Ink

From the viewpoint of ink jet suitability, a viscosity of the ink according to the present disclosure is preferably 5 mPa·s to 50 mPa·s, more preferably 10 mPa·s to 30 mPa·s, and still more preferably 10 mPa·s to 25 mPa·s.

The Viscosity Means a Value Measured at 25° C.

The viscosity is a value measured using a viscometer, and can be measured using, for example, VISCOMETER RE-85L (manufactured by TOKI SANGYO CO., LTD.).

From the viewpoint of ink jet suitability, a surface tension of the ink according to the present disclosure is preferably 60 mN/m or less, more preferably 20 mN/m to 50 mN/m, and still more preferably 25 mN/m to 45 mN/m.

The surface tension means a value measured at 25° C.

The surface tension is a value measured using a surface tensiometer, and can be measured using, for example, product name "Automatic Surface Tentiometer CBVP-Z (manufactured by Kyowa Interface Science Co., Ltd.)".

Ink Set

The ink set according to the present disclosure contains the ink according to the present disclosure (that is, the active energy ray curable-type ink) described above.

The ink set according to the present disclosure may be a set including two or more of the inks according to the present disclosure described above, or may be a set including two or more of the inks according to the present disclosure described above and one or more inks other than the ink according to the present disclosure.

Since the ink set according to the present disclosure contains the ink according to the present disclosure, the same effects as the effects of the ink according to the present disclosure can be exhibited by the ink set according to the present disclosure.

According to the ink set according to the present disclosure, an image of a multi-color can be recorded.

The ink set according to the present disclosure can contain an ink other than the ink according to the present disclosure (hereinafter, also referred to as "other inks"), and the other inks are not particularly limited as long as they are an ink which does not satisfy at least one of the conditions of the ink according to the present disclosure.

The other inks may be an ink which does not satisfy a part of the conditions of the ink according to the present disclosure (for example, the pigment type, the Mp/D ratio, and the like), and satisfy the remaining conditions.

For the components of the other inks in this case, the description of the ink according to the present disclosure can be appropriately referred to.

For example, the other inks may be an ink in which the vinyl chloride/acetate-coated pigment in the ink according to the present disclosure (that is, the vinyl chloride/acetate-coated pigment in which the specific magenta pigment or the specific yellow pigment is coated with the vinyl chloride/acetate resin) is changed to other vinyl chloride/acetate-coated pigments.

The other vinyl chloride/acetate-coated pigments herein are vinyl chloride/acetate-coated pigments obtained by coating a pigment other than the specific magenta pigment and the specific yellow pigment (hereinafter, also referred to as "other pigments") with the vinyl chloride/acetate resin.

In addition, as another aspect of the other inks, the other pigments may be contained in the ink, except for other forms of the vinyl chloride/acetate-coated pigment.

As the other pigments which can be contained in the ink, pigments described in known documents, such as JP5901335B, can be used without particular limitation.

Examples of the other pigments include known organic pigments and inorganic pigments, and resin particles dyed with a dye, commercially available pigment dispersions, and surface-treated pigments (for example, those obtained by dispersing a pigment in water, a liquid organic compound, an insoluble resin, or the like as a dispersion medium, and those obtained by treating a pigment surface with a resin, a pigment derivative, or the like).

Examples of the other pigments include those described in "Pigment Dictionary" edited by Seiji Ito (2000, published by Asakura Shoten), "Organic Pigment Handbook" written by Isao Hashimoto (2006, published by Color Office), "Industrial Organic Pigments" edited by W. Herbst and K. Hunger (1992, Wiley-VHC), JP2002-12607A, JP2002-188025A, JP2003-26978A, JP2003-342503A, and JP2009-235370A.

Examples of the organic pigment include a yellow pigment, a magenta pigment, a cyan pigment, a green pigment, an orange pigment, a brown pigment, a violet pigment, a black pigment, and a white pigment.

Examples of a yellow pigment as the other pigments include a monoazo pigment, a disazo pigment, a non-benzidine-based azo pigment, an azo lake pigment, a condensed azo pigment, an acidic dye lake pigment, a basic dye lake pigment, an anthraquinone pigment, a quinophthalone pigment, a pyrazolone pigment, an acetylone pigment, a metal complex salt pigment, a nitroso pigment, a metal complex azomethine pigment, a benzimidazolone pigment, and an isoindoline pigment (excluding the specific yellow pigment).

Among these, examples of a pigment which can be preferably used include C. I. Pigment Yellow (hereinafter, abbreviated as PY) 1, PY3, PY12, PY13, PY14, PY16, PY17, PY18, PY24, PY60, PY74, PY83, PY93, PY94, PY95, PY97, PY100, PY109, PY115, PY117, PY120, PY128, PY133, PY139, PY151, PY153, PY154, PY166, PY167, PY173, PY175, PY180, PY181, PY194, PY213, PY214, and PY219.

Among these, a benzimidazolone pigment such as a monoazo pigment, a disazo pigment, and an acetron pigment or an isoindoline pigment is preferable, and an isoindoline pigment is most preferable.

Examples of a magenta pigment as the other pigments include a monoazo-based pigment, a β-naphthol pigment, a disazo pigment, an azole pigment, a condensed azo pigment, an acidic dye lake pigment, a basic dye lake pigment, an anthraquinone-based pigment, a thioindigo pigment, a perinone pigment, a perylene pigment, a quinacridone pigment, an isoindolinone pigment, an alizarin lake pigment, a naphthol pigment, a naphthol AS-based lake pigment, a naphthol AS pigment, and a diketopyrrolopyrrole pigment (excluding the specific magenta pigment).

Among these, examples of a pigment which can be preferably used include C. I. Pigment Red (hereinafter, abbreviated as PR) 1, PR2, PR3, PR4, PR5, PR6, PR21, PR38, PR42, PR46, PR53:1, PR57:1, PR52:1, PR46, PR48, PR81, PR83, PR88, PR144, PR149, PR166, PR179, PR178, PR190, PR224, PR123, PR224, PR19, PR122, PR202, PR207, PR209, PR180, PR83, PR170, PR171, PR172, PR174, PR175, PR176, PR177, PR179, PR185, PR194, PR208, PR214, PR220, PR221, PR242, PR247, PR255, PR256, PR262, PR268, PR264, PR269, PR272, and PR282, and C. I. Pigment Violet 19.

Among these, a quinacridone pigment is preferable, and unsubstituted quinacridone, dimethylquinacridone, dichloroquinacridone, or a mixed crystal thereof, such as PR42, PR122, PR202, PR209, PR282, and C. I. Pigment Violet (hereinafter, abbreviated as PV) 19, is preferable.

Examples of a cyan pigment as the other pigments include a disazo-based pigment, a phthalocyanine pigment, an acidic dye lake pigment, a basic dye lake pigment, an anthraquinone-based pigment, and an alkali blue pigment.

Examples of a pigment which can be preferably used include C. I. Pigment Blue (hereinafter, abbreviated as PB)

1, PB15, PB15:1, PB15:2, PB15:3, PB15:4, PB15:6, PB16, PB18, PB24, PB25, PB60, and PB79.

Among these, a copper phthalocyanine pigment is preferable, and PB15, PB15:1, PB15:2, PB15:3, PB15:4, or PB15:6 is preferable.

Examples of a green pigment as the other pigments include a phthalocyanine pigment and a metal complex pigment. Examples of a pigment which can be preferably used include C. I. Pigment Green (hereinafter, abbreviated as PG) 7, PG8, PG10, and PG36.

An orange pigment as the other pigments is a pigment exhibiting an orange color, and examples thereof include an isoindoline pigment, an anthraquinone pigment, a β-naphthol pigment, a naphthol AS pigment, an isoindolinone pigment, a perinone pigment, a disazo pigment, a quinacridone pigment, an acetylron pigment, and a pyrazolone pigment. Examples of a pigment which can be preferably used include C. I. Pigment Orange (hereinafter, abbreviated as PO) 2, PO3, PO4, PO5, PO13, PO15, PO16, PO22, PO24, PO34, PO36, PO38, PO43, PO48, PO49, PO51, PO55, PO60, PO61, PO62, PO64, PO66, PO72, and PO74. Among these, an isoindoline pigment is preferable.

Examples of a brown pigment as the other pigments include naphthol pigments such as PBr25 and PBr32.

Examples of a violet pigment as the other pigments include a naphthol pigment, a perylene pigment, a naphthol AS pigment, and a dioxazine pigment. Examples of a pigment which can be preferably used include C. I. Pigment Violet (hereinafter, abbreviated as PV) 13, PV17, PV23, PV29, PV32, PV37, and PV50.

Examples of a black pigment as other pigments include carbon black, an indazine pigment, a perylene pigment, and the like, and specific examples thereof include C. I. Pigment Black (hereinafter, abbreviated as PBk) 1, PBk 7, PBk 31, and PBk 32. Among these, from the viewpoint of color developability and light fastness, quinacridone pigments such as PB15:3, 15:4, 15:6, PR122, and PV19, and solid solutions of these pigments; PY74, 139, 120, 151, 154, 180, and PBk7; or the like are suitable.

Examples of a white pigment as the other pigments include zinc oxide which is C. I. Pigment White 4, titanium oxide which is C. I. Pigment White 6, zinc sulfide which is C. I. Pigment White 7, zirconium oxide (zirconium white) which is C. I. Pigment White 12, calcium carbonate which is C. I. Pigment White 18, aluminum oxide and silicon oxide (kaolin clay) which is C. I. Pigment White 19, barium sulfate which is C. I. Pigment White 21 or 22, aluminum hydroxide (alumina white) which is C. I. Pigment White 23, silicon oxide which is C. I. Pigment White 27, and calcium silicate which is C. I. Pigment White 28.

The inorganic particles used as the white pigment may be used alone, or may be composite particles of an oxide of silicon, aluminum, zirconium, titanium, or the like, an organometallic compound, or an organic compound.

Among these, titanium oxide is suitably used. In addition to the titanium oxide, another white pigment (which may be a white pigment other than the above-described white pigments) may be used in combination.

Image Recording Method

The image recording method according to the present disclosure is an image recording method in which the ink according to the present disclosure or the ink set according to the present disclosure is used.

The image recording method according to the present disclosure includes a step of applying the active energy ray curable-type ink onto a base material for image recording, containing a polymer including vinyl chloride as a constitutional unit, by an ink jet recording method to record an image.

The image recording method according to the present disclosure may include other steps, as necessary.

In the image recording method according to the present disclosure, since the ink according to the present disclosure is used, the same effects as the effects of the ink according to the present disclosure can be exhibited by the image recording method according to the present disclosure.

Base Material for Image Recording

In the image recording method according to the present disclosure, a base material for image recording, containing a polymer including vinyl chloride as a constitutional unit, is used.

The polymer including vinyl chloride as a constitutional unit may be a homopolymer of vinyl chloride (that is, polyvinyl chloride), or may be a copolymer including vinyl chloride and a monomer other than the vinyl chloride as a constitutional unit.

Examples of the copolymer including vinyl chloride and a monomer other than the vinyl chloride as a constitutional unit include a vinyl chloride-urethane copolymer, a vinyl chloride-ethylene copolymer, a vinyl chloride-vinyl acetate copolymer, a vinyl chloride-vinyl acetate-maleic acid copolymer, a vinyl chloride-vinyl acetate-vinyl alcohol copolymer, and a vinyl chloride-ethylene-vinyl acetate copolymer.

Among these, the base material for image recording preferably contains polyvinyl chloride.

The base material for image recording may contain a component other than the polymer including vinyl chloride as a constitutional unit. Examples of other components include a plasticizer, a stabilizer, an antioxidant, an ultraviolet absorbing agent, a binder resin, and a white pigment.

The base material for image recording may include a layer containing the polymer including vinyl chloride as a constitutional unit and a surface-treated layer, but from the viewpoint of obtaining the adhesiveness between the base material for image recording and the image by dissolving the ink in the base material for image recording, it is preferable that the base material for image recording does not include the surface-treated layer. That is, the surface of the base material for image recording to be applied with the ink preferably contains the polymer including vinyl chloride as a constitutional unit.

A thickness of the base material for image recording is not particularly limited, but is, for example, preferably 0.1 μm to 1,000 μm, more preferably 0.1 μm to 800 μm, and still more preferably 1 μm to 500 μm.

Step of Recording Image

The step of recording an image (hereinafter, also referred to as "image recording step") in the image recording method according to the present disclosure is a step of applying the ink according to the present disclosure onto the above-described base material for image recording by an ink jet recording method to record an image.

Application of Ink

The ink application method (that is, ejection method) by the ink jet recording method is not particularly limited, and for example, any known methods such as an electric charge control method of jetting the ink using electrostatic attraction force, a drop-on-demand method (pressure pulse method) using vibration pressure of a piezoelectric element, an acoustic ink jet method of converting an electric signal into an acoustic beam, irradiating the ink with the acoustic beam, and jetting the ink by using radiation pressure, a thermal ink jet method (BUBBLE JET (registered trademark)) of heating the ink, forming bubbles, and using generated pressure, and the like may be used.

As the ink jet recording method, particularly, it is possible to effectively use the method described in JP1979-59936A (JP-S54-59936A), which is an ink jet recording method of causing an ink to experience a rapid volume change by the action of thermal energy and jetting the ink from a nozzle by using the acting force resulting from the change of state. As the ink jet recording method, a method described in paragraphs 0093 to 0105 of JP2003-306623A can also be applied.

The application of the ink onto the base material for image recording by the ink jet recording method can be performed by allowing the ink to be jetted from a nozzle of an ink jet head.

The way of using the ink jet head also includes a shuttle method of performing recording while a short serial head is allowed to scan in the width direction of the recorded medium, and a line method of using a line head in which recording elements are arranged correspondingly to the entire range of one side of the recorded medium.

In the line method, image recording can be performed on the entire surface of the recorded medium by scanning the recorded medium in a direction intersecting the direction in which the recording elements are aligned. In the line method, a transport system such as a carriage that allows the short head to perform scanning in the shuttle method is unnecessary. In addition, in the line method, as compared with the shuttle method, a carriage is not required to move, and a complicated scanning control with the recorded medium is unnecessary, and only the recorded medium moves. Therefore, according to the line method, an increase in the recording speed of an image is achieved as compared with the shuttle method.

The ink is preferably applied using an ink jet head having a resolution of 300 dpi or more (more preferably 600 dpi or more and still more preferably 800 dpi or more). Herein, dpi is an abbreviation for dot per inch, and 1 inch is 2.54 cm.

From the viewpoint of obtaining a high-definition image, the amount of liquid droplets of the ink jetted from nozzles of the ink jet head is preferably 1 picoliter (μL) to 10 μL and more preferably 1.5 μL to 6 μL.

Drying

The image recording step preferably includes a step of drying the applied ink, after the ink has been applied onto the base material for image recording.

The ink may be dried by natural drying, but is preferably dried by heating.

A heating temperature in the heating drying is preferably 30° C. to 90° C. and more preferably 50° C. to 80° C.

Examples of the method of the heating drying include a method using infrared (IR) drying, hot air drying, and heating and drying using a heating device (for example, a heater, a hot plate, a heating furnace, or the like).

The heating drying can be performed by heating the ink from at least one of an image-recorded surface side or an image non-recorded surface side of the base material for image recording.

Active Energy Ray Irradiation

The image recording step preferably includes a step of irradiating the applied ink with active energy ray, after the ink has been applied onto the base material for image recording.

By irradiating the ink applied onto the base material for image recording with active energy ray, a polymerization reaction of the polymerizable compound contained in the ink proceeds. As a result, the image can be fixed, and a hardness or the like of the image can be improved.

Examples of the active energy ray include ultraviolet rays, visible rays, and electron beams. Among these, ultraviolet rays are preferable as the active energy ray.

A peak wavelength of the ultraviolet rays is preferably 200 nm to 405 nm, more preferably 220 nm to 390 nm, and still more preferably 220 nm to 380 nm.

The exposure amount of ultraviolet rays is preferably 20 $mJ/cm^2$ to 5 $J/cm^2$ and more preferably 100 $mJ/cm^2$ to 1,500 $mJ/cm^2$. As irradiation conditions and basic irradiation method, irradiation conditions and irradiation method described in JP1985-132767A (JP-S60-132767A) can be adopted. Specifically, the irradiation method is preferably a method of providing a light source on both sides of a head unit including an ink jet device and scanning the substrate by the head unit and the light source by a so-called shuttle method, or a method of irradiating the substrate with another light source that is not involved in driving.

As a light source for the ultraviolet irradiation, a discharge lamp or a laser light source (such as a gas laser and a solid-state laser) is mainly used, and as the discharge lamp, for example, a mercury lamp, a metal halide lamp, and an ultraviolet fluorescent lamp are widely known. In addition, a semiconductor light source such as ultraviolet light emitting diode (UV-LED) and ultraviolet laser diode (UV-LD) is expected as the light source for the ultraviolet irradiation because it is compact, has long service life and high efficiency, and is inexpensive. Among these, a metal halide lamp, a high-pressure mercury lamp, a medium-pressure mercury lamp, a low-pressure mercury lamp, or UV-LED is preferable as the light source for the ultraviolet irradiation.

Manufacturing Method of Laminate

The manufacturing method of a laminate according to the present disclosure includes a step of obtaining an image recorded material including the base material for image recording and the image by the image recording method described above, and a step of laminating a base material for lamination, containing a polymer including vinyl chloride as a constitutional unit, on the image of the image recorded material to obtain a laminate.

The manufacturing method of a laminate according to the present disclosure may include other steps, as necessary.

In the manufacturing method of a laminate according to the present disclosure, since the ink according to the present disclosure is used in the step of obtaining the image recorded material, the same effects as the effects of the ink according to the present disclosure can be exhibited by the manufacturing method of a laminate according to the present disclosure.

Step of Obtaining Image Recorded Material

The manufacturing method of a laminate according to the present disclosure includes a step of obtaining an image recorded material including the base material for image recording and the image by the image recording method described above.

Details of the step of obtaining the image recorded material can be appropriately referred to the image recording method according to the present disclosure described above.

Step of Obtaining Laminate

The manufacturing method of a laminate according to the present disclosure includes a step of laminating a base material for lamination, containing a polymer including vinyl chloride as a constitutional unit, on the image of the image recorded material to obtain a laminate.

Base Material for Lamination

The base material for lamination contains a polymer including vinyl chloride as a constitutional unit.

A preferred aspect of the base material for lamination is the same as the preferred aspect of the base material for image recording, and the description thereof will be omitted.

Lamination

In this step, a laminate is obtained by laminating the base material for lamination on the image in the image recorded material.

In a case of the lamination, the base material for lamination may be directly disposed on the image, or may be disposed through other layers such as an adhesive layer.

However, in the manufacturing method of a laminate according to the present disclosure, the ink film (that is, the image) obtained by curing the ink has excellent thermal plasticity, and thus it is preferable that the other layers are not disposed.

That is, it is preferable that the image and the base material for lamination are overlapped with each other so as to be in contact with each other and laminated. As a result, a laminate having a laminated structure of base material for image recording/image/base material for lamination is obtained.

The lamination is preferably performed by thermocompression-bonding the image and the base material for lamination at a temperature of 100° C. or higher.

In a case where the weighted average value of glass transition temperatures when all the polymerizable monomers contained in the ink are homopolymers is 0° C. to 100° C., the image and the base material for lamination are thermocompression-bonded to each other by performing thermocompression bonding at a temperature of 100° C. or higher, and the adhesiveness between the image and the base material for lamination is further improved.

From the viewpoint of suppressing thermal decomposition, the upper limit value of the temperature in a case of performing the thermocompression bonding is preferably 200° C., more preferably 160° C., and still more preferably 140° C.

The temperature during the thermocompression bonding means a surface temperature of the base material for lamination.

A pressure during the thermocompression bonding is preferably 0.1 MPa to 20 MPa and more preferably 0.5 MPa to 15 MPa.

A time for the thermocompression bonding is, for example, 10 seconds to 500 seconds.

The thermocompression bonding may be performed in two stages. For example, a pressure at the first stage may be set to 0.5 MPa to 5 MPa, and a pressure at the second stage may be set to 6 MPa to 15 MPa, which is higher than the pressure at the first stage.

The laminate obtained by the manufacturing method of a laminate according to the present disclosure can be used, for example, as a floor material or a wall material of a transportation device (railway, bus, or the like), or a floor material or a wall material of a building.

EXAMPLES

Hereinafter, the present disclosure will be described in more detail using Examples. However, the present disclosure is not limited to the following examples as long as it does not exceed the gist of the present invention.

Examples 1 to 10 and 101 to 106, and Comparative Examples 1 to 5 and 101 and 102

Production of Vinyl Chloride/Acetate-Coated Pigment

Methyl ethyl ketone (300 g) was put into a 500 mL beaker, a pigment (50 g) and a pigment dispersion resin (Solsperse 39000 manufactured by Lubrizol Japan Ltd.) (5 g) were added thereto, and the mixture was stirred at 2,500 rpm for 120 minutes using a mixer (LAR manufactured by Silverson Machines, Inc.) to obtain a pigment dispersion liquid 1.

A vinyl chloride/acetate resin (that is, a vinyl chloride-vinyl acetate copolymer resin) shown in Table 1 or Table 2 was added to the obtained pigment dispersion liquid 1, and the mixture was stirred at 2,500 rpm for 10 minutes using a mixer (LAR manufactured by Silverson Machines, Inc.), thereby obtaining a pigment dispersion liquid 2. Here, the amount of the vinyl chloride/acetate resin used was adjusted such that a mass ratio of the vinyl chloride/acetate resin to the pigment was a value shown in Table 1 or Table 2.

In the obtained pigment dispersion liquid 2, the pigment was coated with the vinyl chloride/acetate resin through a pigment dispersing agent 1 to form a vinyl chloride/acetate-coated pigment.

Next, the pigment dispersion liquid 2 was heated to evaporate the methyl ethyl ketone, thereby obtaining a vinyl chloride/acetate-coated pigment in a solid state.

In Comparative Example 3, a vinyl acetate-coated pigment (that is, a polyvinyl acetate-coated pigment) was obtained in the same manner as in the production of the vinyl chloride/acetate-coated pigment, except that a vinyl acetate resin was used instead of the vinyl chloride/acetate resin.

Each of components shown in Table 1 or Table 2 is as follows.

Pigment (Magenta Pigment)

- PR254 . . . . Pigment Red 254
- PR146 . . . . Pigment Red 146
- PR150 (comparison) . . . . Pigment Red 150
- PR202 (comparison) . . . . Pigment Red 202

Pigment (Yellow Pigment).

- PY110 . . . . Pigment Yellow 110.
- PY155 . . . . Pigment Yellow 155.
- PY138 . . . . Pigment Yellow 138.
- PY150 . . . . Pigment Yellow 150
- PY184 . . . . Pigment Yellow 184
- PY185 . . . . Pigment Yellow 185.
- PY109 (comparison) . . . . Pigment Yellow 109
- PY180 (comparison) . . . . Pigment Yellow 180

Vinyl Chloride/Acetate Resin (that is, Vinyl Chloride-Vinyl Acetate Copolymer Resin)

- Vinyl chloride/acetate resin 1 . . . . Vinnol H40/43 manufactured by Wacker Chemie AG; a vinyl chloride/vinyl acetate ratio (that is, a mass ratio of a vinyl chloride unit to a vinyl acetate unit) is shown in Table 1; Mw: 40,000 to 50,000, Tg: 58° C.
- Vinyl chloride/acetate resin 2 . . . . Vinnol H40/50 manufactured by Wacker Chemie AG; the vinyl chloride/vinyl acetate ratio is shown in Table 1;
- Vinyl chloride/acetate resin 3 . . . . SOLBIN C manufactured by Nissin Chemical co., ltd.; the vinyl chloride/vinyl acetate ratio is shown in Table 1; Mw: 75,000, Tg: 70° C.
- Vinyl chloride/acetate resin 4 . . . . SOLBIN CNL manufactured by Nissin Chemical co., ltd.; the vinyl chloride/vinyl acetate ratio is shown in Table 1; Mw: 35,000, Tg: 69° C.
- Vinyl acetate resin (that is, polyvinyl acetate resin) (comparative resin)
- Vinyl acetate resin (comparative) . . . polyvinyl acetate resin manufactured by FUJIFILM Wako Pure Chemical Corporation; Mw: 90,000

A numerical value of each component in Table 1 means a content (% by mass) of each component with respect to the total amount of the ink finally obtained.

A blank in Table 1 means that the corresponding component was not contained.

Preparation of Ink

The vinyl chloride/acetate-coated pigment or the vinyl acetate-coated resin and components other than the vinyl chloride/acetate-coated pigment and the vinyl acetate-coated resin, shown in Table 1 or Table 2, were mixed such that a mixing ratio was a content (% by mass) shown in Table 1 or Table 2, thereby preparing an ink.

Here, the content (% by mass) of the pigments shown in Table 1 or Table 2 is a value adjusted such that an optical density (OD) of a solid image recorded with an ink application amount of 6 $g/m^2$ was 0.8 in a case of magenta and was 0.6 in a case of yellow.

Details of the components other than the vinyl chloride/acetate-coated pigment and the vinyl acetate-coated resin in Table 1 or Table 2 are as follows.

Polymerizable Monomer A

EOEOEA . . . etoxyethyethygolicol acrylate; molecular weight: 188, SP value: 18.2 $MPa^{1/2}$, Tg of homopolymer: −54° C.

CHA . . . cyclohexyl acrylate; molecular weight: 154, SP value: 17.9 $MPa^{1/2}$, Tg of homopolymer: 15° C.

N-Vinyl Compound

NVC . . . N-vinylcaprolactam; molecular weight: 139, SP value: 19.2 $MPa^{1/2}$, Tg of homopolymer: 90° C.

Polymerization Initiator

ITX . . . 2-isopropylthioxanthone

Omni. 819 . . . bis(2,4,6-trimethylbenzoyl)phenylphosphine oxide (product name "Omnirad 819", manufactured by IGM Resins B.V.)

Omni. TPO-H . . . 2,4,6-trimethylbenzoyldiphenylphosphine oxide (product name "Omnirad TPO-H", manufactured by IGM Resins B.V.)

Polymerization inhibitor

TEMPOL . . . 4-hydroxy-2,2,6,6-tetramethylpiperidine-1-oxyl Resin

Resin T1 . . . resin T1 (weight-average molecular weight: 10,000) shown below, which was synthesized according to the synthesis method of Example 8 of JP6861811B

| Resin T1 | | | |
|---|---|---|---|
| Structure | 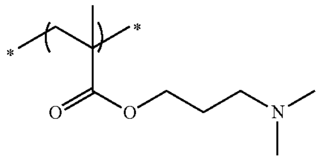 | 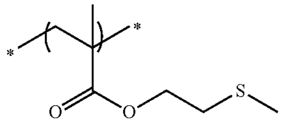 | 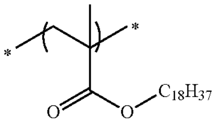 |
| Mass ratio | 57 | 5 | 38 |
| SP value ($MPa^{1/2}$) | 18.3 | 19.0 | 17.0 |

Image Recording

As a base material for image recording, a polyvinyl chloride base material (product name "PVC35 phr", manufactured by OKAMOTO INDUSTRIES, INC.) was prepared.

A rubber heater (SR100 manufactured by Three High Co., Ltd.) and an ultraviolet (UV) irradiation device (Vzero manufactured by Integration Technology Ltd.) were attached to an ink jet printer (KEGON) manufactured by Affinity Co., Ltd. to prepare an ink jet printer modification machine. An output of the rubber heater was set such that the base material for image recording, on which the ink had been applied, could be heated to approximately 60° C. A drying time of the ink in a case of performing the UV irradiation (that is, a time from landing of the ink jetted from the ink jet head on the base material for image recording to the UV irradiation) was adjusted to 10 seconds. The adjustment of the drying time of the ink in this case was performed by adjusting a transportation speed (5 m/min to 25 m/min) and the timing of opening and closing an UV shutter.

The above-described ink was jetted from the ink jet head of the ink jet printer modification machine to record a solid image on the base material for image recording, thereby obtaining an image recorded material having a laminated structure of base material for image recording/image. A resolution in the image recording was set to 1200 dots per inch (dpi)×600 dpi.

Production of Laminate

As a base material for lamination, a polyvinyl chloride base material (product name "SG800", manufactured by K&H Trading Co., Ltd., thickness: 75 μm) was prepared.

The base material for lamination was laminated on the image in the image recorded material to obtain a laminate having a laminated structure of base material for image recording/image/base material for lamination.

The above-described lamination was performed using a desktop automatic transfer press machine (product name "AF-54TEN", Asahi Seisakusho Ltd.) at a thermocompression bonding temperature of 130° C., a pressure of 2 MPa for 300 seconds, and a pressure of 10 MPa for 60 seconds.

Evaluation

The following evaluations were performed on the ink and the image recorded material.

The results are shown in Table 1 or Table 2.

PVC Lamination Adhesiveness of Image

An image recording sample of 3.2 cm×3.2 cm was cut out from a region in the image recorded in the above-described image recorded material.

In addition, as a base material for lamination, a polyvinyl chloride (PVC) base material (product name "SG800", manufactured by K&H TRADING Co., Ltd., thickness: 75 μm) was prepared, and a base material sample for lamination, having a size of 3.2 cm×3.2 cm, was cut out from the base material for lamination.

A polyethylene terephthalate (PET) sheet having a thickness of 12 μm was disposed on the image of the image recording sample in a region of 1.0 cm×3.2 cm including one side of the image recording sample. Next, a base material sample for lamination, having a size of 3.2 cm×3.2 cm, was superimposed on the entire image of the image recording sample, the region (region of 1.0 cm×3.2 cm) where the PET sheet had been disposed, and the region (region of 2.2 cm×3.2 cm) where the PET sheet was not disposed.

In this state, the image recording sample and the base material sample for lamination were laminated under the same conditions as in the production of the laminate described above. An evaluation sample was obtained by removing the PET sheet from the obtained laminate.

In the evaluation sample, the region where the PET sheet was not disposed before the lamination was adhered to the image recording sample and the base material sample for lamination. On the other hand, in the evaluation sample, the region where the PET sheet had been disposed before the lamination was not adhered to the image recording sample and the base material sample for lamination.

Next, in the region where the image-recording sample and the base material sample for lamination were not adhered, a peeling strength was measured by performing a tensile test of pulling the image recording sample and the base material sample for lamination in opposite directions. The tensile test was carried out using a tensile tester (product name "Autograph AGS-X 5KN", manufactured by Shimadzu Corporation).

Two of the evaluation sample were produced, and the tensile test was performed on each of the two evaluation samples.

An average value of the peel strengths for each of the two evaluation samples was calculated, and based on the obtained average value of the peel strengths, PVC lamination adhesiveness was evaluated according to the following evaluation standard.

In the following evaluation standard, the rank at which the PVC lamination adhesiveness was most excellent is "6".

Evaluation Standard for PVC Lamination Adhesiveness

6: average value of the peel strengths was 9 N/cm or more.

5: average value of the peel strengths was 7 N/cm or more and less than 9 N/cm.

4: average value of the peel strengths was 3 N/cm or more and less than 7 N/cm.

3: average value of the peel strengths was 2 N/cm or more and less than 3 N/cm.

2: average value of the peel strengths was 1 N/cm or more and less than 2 N/cm.

1: average value of the peel strengths was 0.1 N/cm or more and less than 1 N/cm.

0: peel strength was less than 0.1 N/cm.

Ink Jet Suitability of Ink

Ink jet suitability of each ink was evaluated as follows.

The images were continuously recorded on 40 sheets of a recording paper under the same conditions as in the image recording described above, except that the polyvinyl chloride base material as the base material for image recording was changed to a recording paper for ink jet (KASSAI, manufactured by FUJIFILM Corporation). Hereinafter, the recording paper on which the image was recorded is referred to as "sample for evaluation of ink jet suitability".

40 sheets of the sample for evaluation of ink jet suitability were visually observed, and the number of samples for evaluation of ink jet suitability, in which nozzle slipping (that is, image defects caused by poor jetting of the nozzle) was confirmed, was examined. Based on the results, ink jet suitability of the ink was evaluated according to the following evaluation standard.

In the following evaluation standard, the rank at which the ink jet suitability of the ink was most excellent is "5".

Evaluation standard for ink jet suitability of ink

5:0 sample in which the nozzle slipping was confirmed in the 40 samples

4:1 or 2 samples in which the nozzle slipping was confirmed in the 40 samples

3:3 or 4 samples in which the nozzle slipping was confirmed in the 40 samples

2:5 to 8 samples in which the nozzle slipping was confirmed in the 40 samples

1:9 or more samples in which the nozzle slipping was confirmed in the 40 samples Light Fastness of Image With the image in the image recorded material, using a xenon weather meter XL75 manufactured by Suga Test Instruments Co., Ltd., an accelerated light fastness test was performed under conditions of an irradiance of 40 $W/m^2$, a black panel temperature of 35° C., and a humidity of 55% RH.

A CIE LAB value (L*, a*, b*) of the image was measured using a colorimeter "x-rite eXact" manufactured by X-Rite, Inc. under the conditions of a light source D50 and status-T before the accelerated light fastness test and after the accelerated light fastness test had been started and 350 hours had passed. Based on the obtained results, a color difference $\Delta E$ was calculated.

Based on the obtained color difference $\Delta E$, light fastness of the image was evaluated according to the following evaluation standard.

In the following evaluation standard, the rank at which the light fastness of the image was most excellent is "5".

Evaluation Standard for Light Fastness

5: $\Delta E \leq 3$

4: $3 < \Delta E \leq 5$

3:$5 < \Delta E \leq 7$

2:$7 < \Delta E \leq 9$

1:$9 < \Delta E$

TABLE 1

| | | | Example 1 | Example 2 | Example 3 | Example 4 | Example 5 |
|---|---|---|---|---|---|---|---|
| Polymerizable compound | Polymerizable monomer A | EOEOEA | 17.7 | 17.7 | 17.7 | 17.7 | 17.7 |
| | | CHA | 44.3 | 44.3 | 44.3 | 44.3 | 44.3 |
| | N-vinyl compound | NVC | 26.6 | 26.6 | 26.6 | 26.6 | 26.6 |
| Vinyl chloride/acetate-coated pigment (or vinyl acetate-coated pigment (comparison)) | Magenta pigment | PR254 | 1.80 | | 1.80 | 1.80 | 1.80 |
| | | PR146 | | 1.80 | | | |
| | | PR150 (comparison) | | | | | |
| | | PR202 (comparison) | | | | | |
| | Yellow pigment | PY110 | | | | | |
| | | PY155 | | | | | |
| | | PY138 | | | | | |
| | | PY150 | | | | | |
| | | PY184 | | | | | |

TABLE 1-continued

| | | | | | | | |
|---|---|---|---|---|---|---|---|
| | | PY185 | | | | | |
| | | PY 109 (comparison) | | | | | |
| | Vinyl chloride/acetate resin 1 | Vinyl chloride/ vinyl acetate ratio = 1.9 | 1.62 | 1.62 | | | |
| | Vinyl chloride/acetate resin 2 | Vinyl chloride/ vinyl acetate ratio = 1.7 | | | 1.62 | | |
| | Vinyl chloride/acetate resin 3 | Vinyl chloride/ vinyl acetate ratio = 6.7 | | | | 1.62 | |
| | Vinyl chloride/acetate resin 4 | Vinyl chloride/ vinyl acetate ratio = 9.0 | | | | | 1.62 |
| | Vinyl acetate resin (comparative resin) | | | | | | |
| Photopolymerization initiator | | ITX | 2.0 | 2.0 | 2.0 | 2.0 | 2.0 |
| | | Omni. 819 | 2.8 | 2.8 | 2.8 | 2.8 | 2.8 |
| | | Omni. TPO-H | 2.8 | 2.8 | 2.8 | 2.8 | 2.8 |
| Polymerization inhibitor | | TEMPOL | 0.3 | 0.3 | 0.3 | 0.3 | 0.3 |
| Resin | | Resin T1 | | | | | |
| Mass ratio of vinyl chloride/acetate resin (or vinyl acetate resin) with respect to pigment | | | 0.90 | 0.90 | 0.90 | 0.90 | 0.90 |
| Specific gravity D of pigment | | | 1.57 | 1.60 | 1.57 | 1.57 | 1.57 |
| Mp/D ratio; Mp is % by mass of pigment | | | 1.15 | 1.13 | 1.15 | 1.15 | 1.15 |
| Evaluation | | PVC lamination adhesiveness | 5 | 5 | 5 | 5 | 5 |
| | | Ink jet suitability | 5 | 5 | 5 | 5 | 4 |
| | | Light fastness | 5 | 4 | 5 | 5 | 5 |
| | | | Example 6 | Example 7 | Example 8 | Example 9 | Example 10 |
| Polymerizable compound | Polymerizable monomer A | EOEOEA | 17.7 | 18.0 | 17.8 | 17.6 | 16.6 |
| | | CHA | 44.2 | 44.9 | 44.6 | 44.1 | 41.6 |
| | N-vinyl compound | NVC | 26.5 | 27.0 | 26.8 | 26.4 | 24.9 |
| Vinyl chloride/acetate-coated pigment (or vinyl acetate-coated pigment (comparison)) | Magenta pigment | PR254 | 1.80 | 1.80 | 1.80 | 1.80 | 1.80 |
| | | PR146 | | | | | |
| | | PR150 (comparison) | | | | | |
| | | PR202 (comparison) | | | | | |
| | Yellow pigment | PY110 | | | | | |
| | | PY155 | | | | | |
| | | PY138 | | | | | |
| | | PY150 | | | | | |
| | | PY184 | | | | | |
| | | PY185 | | | | | |
| | | PY109 (comparison) | | | | | |
| | | PY180 (comparison) | | | | | |
| | Vinyl chloride/acetate resin 1 | Vinyl chloride/ vinyl acetate ratio = 1.9 | 1.62 | 0.45 | 1.08 | 2.16 | 7.20 |
| | Vinyl chloride/acetate resin 2 | Vinyl chloride/ vinyl acetate ratio = 1.7 | | | | | |
| | Vinyl chloride/acetate resin 3 | Vinyl chloride/ vinyl acetate ratio = 6.7 | | | | | |
| | Vinyl chloride/acetate resin 4 | Vinyl chloride/ vinyl acetate ratio = 9.0 | | | | | |
| | Vinyl acetate resin (comparative resin) | | | | | | |
| Photopolymerization initiator | | ITX | 2.0 | 2.0 | 2.0 | 2.0 | 2.0 |
| | | Omni. 819 | 2.8 | 2.8 | 2.8 | 2.8 | 2.8 |
| | | Omni. TPO-H | 2.8 | 2.8 | 2.8 | 2.8 | 2.8 |
| Polymerization inhibitor | | TEMPOL | 0.3 | 0.3 | 0.3 | 0.3 | 0.3 |
| Resin | | Resin T1 | 0.3 | | | | |
| Mass ratio of vinyl chloride/acetate resin (or vinyl acetate resin) with respect to pigment | | | 0.90 | 0.25 | 0.60 | 1.20 | 4.00 |
| Specific gravity D of pigment | | | 1.57 | 1.57 | 1.57 | 1.57 | 1.57 |
| Mp/D ratio; Mp is % by mass of pigment | | | 1.15 | 1.15 | 1.15 | 1.15 | 1.15 |
| Evaluation | | PVC lamination adhesiveness | 6 | 3 | 5 | 5 | 5 |
| | | Ink jet suitability | 5 | 5 | 5 | 5 | 3 |
| | | Light fastness | 5 | 5 | 5 | 5 | 5 |
| | | | Comparative Example 1 | Comparative Example 2 | Comparative Example 3 | Comparative Example 4 | Comparative Example 5 |
| Polymerizable compound | Polymerizable monomer A | EOEOEA | 18.0 | 16.3 | 17.7 | 17.9 | 16.9 |
| | | CHA | 45.1 | 40.7 | 44.3 | 44.8 | 42.3 |
| | N-vinyl compound | NVC | 27.0 | 24.4 | 26.6 | 26.9 | 25.4 |
| Vinyl chloride/acetate-coated pigment (or vinyl acetate-coated pigment (comparison)) | Magenta pigment | PR254 | 1.80 | 1.80 | 1.80 | | |
| | | PR146 | | | | | |
| | | PR150 (comparison) | | | | 1.30 | |
| | | PR202 (comparison) | | | | | 3.90 |
| | Yellow pigment | PY110 | | | | | |
| | | PY155 | | | | | |
| | | PY138 | | | | | |
| | | PY150 | | | | | |

TABLE 1-continued

| | | | | | | |
|---|---|---|---|---|---|---|
| | | PY184 | | | | | |
| | | PY185 | | | | | |
| | | PY109 (comparison) | | | | | |
| | | PY180 (comparison) | | | | | |
| | Vinyl chloride/acetate resin 1 | Vinyl chloride/ vinyl acetate ratio = 1.9 | 0.18 | 9.00 | | 1.17 | 3.51 |
| | Vinyl chloride/acetate resin 2 | Vinyl chloride/ vinyl acetate ratio = 1.7 | | | | | |
| | Vinyl chloride/acetate resin 3 | Vinyl chloride/ vinyl acetate ratio = 6.7 | | | | | |
| | Vinyl chloride/acetate resin 4 | Vinyl chloride/ vinyl acetate ratio = 9.0 | | | | | |
| | Vinyl acetate resin (comparative resin) | | | | 1.62 | | |
| Photopolymerization initiator | ITX | | 2.0 | 2.0 | 2.0 | 2.0 | 2.0 |
| | Omni. 819 | | 2.8 | 2.8 | 2.8 | 2.8 | 2.8 |
| | Omni. TPO-H | | 2.8 | 2.8 | 2.8 | 2.8 | 2.8 |
| Polymerization inhibitor | TEMPOL | | 0.3 | 0.3 | 0.3 | 0.3 | 0.3 |
| Resin | Resin T1 | | | | | | |
| Mass ratio of vinyl chloride/acetate resin (or vinyl acetate resin) with respect to pigment | | | 0.10 | 5.00 | 0.90 | 0.90 | 0.90 |
| Specific gravity D of pigment | | | 1.57 | 1.57 | 1.33 | 1.33 | 1.60 |
| Mp/D ratio; Mp is % by mass of pigment | | | 1.15 | 1.15 | 1.35 | 0.98 | 2.44 |
| Evaluation | PVC lamination adhesiveness | | 1 | 5 | 1 | 5 | 1 |
| | Ink jet suitability | | 4 | 1 | 5 | 5 | 1 |
| | Light fastness | | 5 | 5 | 5 | 1 | 5 |

TABLE 2

| | | | Example 101 | Example 102 | Example 103 | Example 104 | Example 105 | Example 106 | Comparative Example 101 | Comparative Example 102 |
|---|---|---|---|---|---|---|---|---|---|---|
| Polymerizable compound | Polymerizable monomer A | EOEOEA | 17.3 | 17.4 | 17.3 | 17.3 | 16.1 | 17.9 | 16.9 | 17.2 |
| | | CHA | 43.2 | 43.4 | 43.2 | 43.3 | 40.4 | 44.7 | 42.3 | 43.1 |
| | N-vinyl compound | NVC | 25.9 | 26.0 | 25.9 | 26.0 | 24.2 | 26.8 | 25.4 | 25.9 |
| Vinyl chloride/acetate-coated pigment (or vinyl acetate-coated pigment (comparison)) | Magenta pigment | PR254 | | | | | | | | |
| | | PR146 | | | | | | | | |
| | | PR150 (comparison) | | | | | | | | |
| | | PR202 (comparison) | | | | | | | | |
| | Yellow pigment | PY110 | 3.00 | | | | | | | |
| | | PY155 | | 2.80 | | | | | | |
| | | PY138 | | | 3.00 | | | | | |
| | | PY150 | | | | 2.90 | | | | |
| | | PY184 | | | | | 6.00 | | | |
| | | PY185 | | | | | | 1.40 | | |
| | | PY109 (comparison) | | | | | | | 3.90 | |
| | | PY180 (comparison) | | | | | | | | 3.10 |
| | Vinyl chloride/acetate resin 1 | Vinyl chloride/vinyl acetate ratio = 1.9 | 2.70 | 2.52 | 2.70 | 2.61 | 5.40 | 1.26 | 3.51 | 2.79 |
| | Vinyl chloride/acetate resin 2 | Vinyl chloride/vinyl acetate ratio = 1.7 | | | | | | | | |
| Vinyl chloride/acetate-coated pigment (or vinyl acetate-coated pigment (comparison)) | Vinyl chloride/acetate resin 3 | Vinyl chloride/vinyl acetate ratio = 6.7 | | | | | | | | |
| | chloride/acetate Vinyl resin 4 | Vinyl chloride/vinyl acetate ratio = 9.0 | | | | | | | | |
| | Vinyl acetate resin (comparative resin) | | | | | | | | | |
| Photopolymerization initiator | ITX | | 2.0 | 2.0 | 2.0 | 2.0 | 2.0 | 2.0 | 2.0 | 2.0 |
| | Omni. 819 | | 2.8 | 2.8 | 2.8 | 2.8 | 2.8 | 2.8 | 2.8 | 2.8 |
| | Omni. TPO-H | | 2.8 | 2.8 | 2.8 | 2.8 | 2.8 | 2.8 | 2.8 | 2.8 |
| Polymerization inhibitor | TEMPOL | | 0.3 | 0.3 | 0.3 | 0.3 | 0.3 | 0.3 | 0.3 | 0.3 |
| Resin | Resin T1 | | | | | | | | | |

TABLE 2-continued

| | | | | | | | | | |
|---|---|---|---|---|---|---|---|---|---|
| Mass ratio of vinyl chloride/acetate resin (or vinyl acetate resin) with respect to pigment | | 0.90 | 0.90 | 0.90 | 0.90 | 0.90 | 0.90 | 0.90 | 0.90 |
| Specific gravity D of pigment | | 1.81 | 1.45 | 1.70 | 1.50 | 5.60 | 1.49 | 1.90 | 1.52 |
| Mp/D ratio; Mp is % by mass of pigment | | 1.66 | 1.93 | 1.76 | 1.93 | 1.07 | 0.94 | 2.05 | 2.04 |
| Evaluation | PVC lamination adhesiveness | 5 | 5 | 5 | 5 | 5 | 5 | 1 | 1 |
| | Ink jet suitability | 5 | 5 | 5 | 5 | 4 | 5 | 1 | 1 |
| | Light fastness | 5 | 4 | 4 | 4 | 5 | 3 | 4 | 1 |

As shown in Tables 1 and 2, the inks of each of Examples contained a resin-coated pigment (that is, the vinyl chloride/acetate-coated pigment) in which the pigment was coated with the vinyl chloride/acetate resin (that is, the vinyl chloride-vinyl acetate copolymer resin) and a polymerizable compound, in which the pigment was a magenta pigment or a yellow pigment, the magenta pigment was at least one selected from the group consisting of PR 146 and PR 254, the yellow pigment was at least one selected from the group consisting of PY110, PY 155, PY185, PY138, PY150, and PY184, the content mass ratio of the vinyl chloride/acetate resin with respect to the pigment was 0.25 to 4.00, and an Mp/D ratio, which is a ratio between a content Mp % by mass of the pigment with respect to the total amount of the ink and a specific gravity D of the pigment, was 2.00 or less.

As shown in Tables 1 and 2, in each of Examples, the PVC lamination adhesiveness of the image, the ink jet suitability of the ink, and the light fastness of the image were excellent.

The results of Comparative Examples for each of Examples were as follows.

In Comparative Example 1 in which the content mass ratio of the vinyl chloride/acetate resin to the pigment was less than 0.25, the PVC lamination adhesiveness of the image was lowered.

In Comparative Example 2 in which the content mass ratio of the vinyl chloride/acetate resin to the pigment was more than 4.00, the ink jet suitability of the ink was lowered.

In Comparative Example 3 in which an ink containing the vinyl acetate resin instead of the vinyl chloride/acetate resin was used, the PVC lamination adhesiveness of the image was lowered.

In Comparative Example 4 in which PR150, which is a magenta pigment for comparison, was used, the light fastness of the image was lowered. The reason for this is considered to be that the light fastness of PR150, which is the magenta pigment for comparison, was low (that is, the light fastness of the pigment itself was low) as compared with PR146 and PR254 of Examples.

In Comparative Example 5 in which PR202, which is a magenta pigment for comparison, was used and the Mp/D ratio was more than 2.00, the PVC lamination adhesiveness of the image and the ink jet suitability of the ink were lowered. The reason for this is considered to be that, since PR202, which is a magenta pigment for comparison, had lower color developability than PR146 and PR254 of Examples, it is necessary to increase the content of the pigment (specifically, to set the Mp/D ratio to be more than 2.00) in order to obtain the same OD (0.8) of the image as in Examples.

In Comparative Example 101 using PY109 as a yellow pigment for comparison and in Comparative Example 102 using PY180 as a yellow pigment for comparison, the PVC lamination adhesiveness of the image and the ink jet suitability of the ink were also lowered for the same reason as in Comparative Example 5.

From the results of Examples 1 and 3 to 5, it was found that, in a case where the vinyl chloride/vinyl acetate ratio (that is, the mass ratio of the vinyl chloride unit to the vinyl acetate unit in the vinyl chloride-vinyl acetate copolymer resin) was 7.0 or less (Examples 1, 3, and 4), the ink jet suitability of the ink was further improved.

From the results of Examples 1 and 6, it was found that, in a case of further containing the resin T1 (Example 6), the PVC lamination resistance was further improved.

Here, the resin T1 is an example of the resin T including a constitutional unit derived from a polymerizable monomer having a solubility parameter of 16.5 $MPa^{1/2}$ to 24.0 $MPa^{1/2}$, and including at least one group selected from the group consisting of a fluorinated hydrocarbon group, a polysiloxane group, and a hydrocarbon group having 12 or more carbon atoms.

Example 201

An image recorded material including a base material for image recording and a 4 C solid image was obtained in the same manner as in Example 1, except that, in the image recording, the magenta ink in Example 1, the yellow ink in Example 103, the following cyan ink C1, and the following black ink Bk1 were applied in this order to record the 4 C solid image.

Using the obtained image recorded material, the same evaluations for the PVC lamination adhesiveness of the image and the light fastness of the image were carried out as in Example 1.

As a result, the same results as in Example 1 were obtained, in which the PVC lamination adhesiveness of the image was “5” and the light fastness of the image was “5”.

Cyan Ink C1

The cyan ink C1 was prepared in the same manner as in the preparation of the magenta ink of Example 1, except that the vinyl chloride/acetate-coated pigment used in the preparation of the magenta ink of Example 1 (that is, the vinyl chloride/acetate-coated magenta pigment) was changed to the following vinyl chloride/acetate-coated cyan pigment.

The content of the cyan pigment (specifically, Pigment Blue 15:3) with respect to the total amount of the cyan ink C1 was 1.80% by mass, and the content of the vinyl chloride/acetate resin 1 was 1.62% by mass.

Vinyl Chloride/Acetate-Coated Cyan Pigment

A vinyl chloride/acetate-coated cyan pigment was obtained in the same manner as in the production of the vinyl chloride/acetate-coated pigment in Example 1 (that is, the vinyl chloride/acetate-coated magenta pigment), except that PR254 as the magenta pigment was changed to Pigment Blue 15:3 as the cyan pigment.

Black Ink Bk1

The black ink Bk1 was prepared in the same manner as in the preparation of the magenta ink of Example 1, except that the vinyl chloride/acetate-coated pigment used in the preparation of the magenta ink of Example 1 (that is, the vinyl chloride/acetate-coated magenta pigment) was changed to the following vinyl chloride/acetate-coated black pigment.

The content of the black pigment (specifically, Pigment Black 7) with respect to the total amount of the black ink Bk1 was 2.80% by mass, and the content of the vinyl chloride/acetate resin 1 was 2.52% by mass.

Vinyl Chloride/Acetate-Coated Black Pigment

A vinyl chloride/acetate-coated black pigment was obtained in the same manner as in the production of the vinyl chloride/acetate-coated pigment in Example 1 (that is, the vinyl chloride/acetate-coated magenta pigment), except that PR254 as the magenta pigment was changed to Pigment Black 7 as the black pigment.

What is claimed is:

1. An active energy ray curable-type ink comprising:

a resin-coated pigment in which a pigment is coated with a vinyl chloride-vinyl acetate copolymer resin; and a polymerizable compound, wherein the pigment is a magenta pigment or a yellow pigment, the magenta pigment is at least one selected from the group consisting of Pigment Red 146 and Pigment Red 254, the yellow pigment is at least one selected from the group consisting of Pigment Yellow 110, Pigment Yellow 155, Pigment Yellow 185, Pigment Yellow 138, Pigment Yellow 150, and Pigment Yellow 184, a content mass ratio of the vinyl chloride-vinyl acetate copolymer resin with respect to the pigment in the resin-coated pigment is 0.25 to 4.00, and in a case where a content of the pigment with respect to a total amount of the active energy ray curable-type ink is denoted as Mp % by mass and a specific gravity of the pigment is denoted as D, an Mp/D ratio is 2.00 or less.

2. The active energy ray curable-type ink according to claim 1, wherein a mass ratio of a vinyl chloride unit with respect to a vinyl acetate unit in the vinyl chloride-vinyl acetate copolymer resin is 7.0 or less.

3. The active energy ray curable-type ink according to claim 1, wherein the polymerizable compound contains a polymerizable monomer A which has a (meth)acryloyl group and has a solubility parameter of 16.5 $MPa^{1/2}$ to 21.3 $MPa^{1/2}$.

4. The active energy ray curable-type ink according to claim 1, further comprising:

a resin T including at least one group selected from the group consisting of a fluorinated hydrocarbon group, a polysiloxane group, and a hydrocarbon group having 12 or more carbon atoms, wherein the resin T includes a constitutional unit derived from a polymerizable monomer having a solubility parameter of 16.5 $MPa^{1/2}$ to 24.0 $MPa^{1/2}$.

5. An ink set comprising:

the active energy ray curable-type ink according to claim 1.

6. An image recording method comprising:

a step of, using the active energy ray curable-type ink according to claim 1, applying the active energy ray curable-type ink onto a base material for image recording, containing a polymer including vinyl chloride as a constitutional unit, by an ink jet recording method to record an image.

7. A manufacturing method of a laminate, comprising:

obtaining an image recorded material including the base material for image recording and the image by the image recording method according to claim 6; and laminating a base material for lamination, containing a polymer including vinyl chloride as a constitutional unit, on the image of the image recorded material to obtain a laminate.

* * * * *